(12) United States Patent
Zhang et al.

(10) Patent No.: US 11,564,170 B2
(45) Date of Patent: Jan. 24, 2023

(54) WAKE UP SIGNALS OPERATION

(71) Applicant: IPLA HOLDINGS INC., New York, NY (US)

(72) Inventors: Guodong Zhang, Woodbury, NY (US); Pascal M. Adjakple, Great Neck, NY (US); Joseph M. Murray, Schwenksville, PA (US); Lakshmi R. Iyer, King of Prussia, PA (US)

(73) Assignee: IPLA HOLDINGS INC., New York, NY (US)

( * ) Notice: Subject to any disclaimer, the term of this patent is extended or adjusted under 35 U.S.C. 154(b) by 0 days.

(21) Appl. No.: 16/610,276

(22) PCT Filed: May 4, 2018

(86) PCT No.: PCT/US2018/031112
§ 371 (c)(1),
(2) Date: Nov. 1, 2019

(87) PCT Pub. No.: WO2018/204799
PCT Pub. Date: Nov. 8, 2018

(65) Prior Publication Data
US 2020/0145921 A1    May 7, 2020

Related U.S. Application Data

(60) Provisional application No. 62/501,181, filed on May 4, 2017.

(51) Int. Cl.
*H04W 52/02* (2009.01)
*H04W 76/28* (2018.01)
(Continued)

(52) U.S. Cl.
CPC ....... *H04W 52/0229* (2013.01); *H04L 5/0051* (2013.01); *H04W 24/08* (2013.01);
(Continued)

(58) Field of Classification Search
CPC .................................................. H04W 52/0229
See application file for complete search history.

(56) References Cited

U.S. PATENT DOCUMENTS

2012/0275364 A1    11/2012    Anderson et al.
2012/0275366 A1*   11/2012    Anderson ........... H04W 68/025
                                                        370/311

(Continued)

FOREIGN PATENT DOCUMENTS

| EP | 02621242 A1 | 7/2013 |
| WO | WO-2016146147 A1 | 9/2016 |

OTHER PUBLICATIONS

3GPP TR 38.913 V0.2.0, "3rd Generation Partnership Project; Technical Specification Group Radio Access Network; Study on Scenarios and Requirements for Next Generation Access Technologies; (Release 14)", Feb. 2016, 19 pages.

(Continued)

*Primary Examiner* — Kevin M Cunningham
(74) *Attorney, Agent, or Firm* — Xsensus LLP

(57) ABSTRACT

Techniques for improved wake-up signal (WUS) operation in a wireless communication system are described. In accordance with one embodiment, a wireless communications device may receive, from a gNB, information indicating parameters associated with a wake-up signal time window and may power down its first receiver and second receiver based on a discontinuous reception (DRX) cycle. The wireless communications device may wake up the second receiver to receive, from the gNB, a wake-up signal during a configured WUS time window and determine whether a wake-up or a non-wake-up condition is indicated. If a wake-up condition is indicated, then the wireless communications device may wake up the first receiver before an on duration of the DRX cycle to synchronize timing with the gNB, detect a new radio physical downlink control channel (Continued)

(NR-PDCCH) during the on duration of the DRX cycle, and reset a size of the wake-up signal time window.

15 Claims, 16 Drawing Sheets

(51) Int. Cl.

| | | |
|---|---|---|
| *H04W 76/11* | (2018.01) | |
| *H04W 76/27* | (2018.01) | |
| *H04L 5/00* | (2006.01) | |
| *H04W 24/08* | (2009.01) | |
| *H04W 24/10* | (2009.01) | |
| *H04W 56/00* | (2009.01) | |
| *H04W 72/04* | (2009.01) | |

(52) U.S. Cl.
CPC ......... *H04W 24/10* (2013.01); *H04W 56/001* (2013.01); *H04W 72/042* (2013.01); *H04W 76/11* (2018.02); *H04W 76/27* (2018.02); *H04W 76/28* (2018.02)

(56) References Cited

U.S. PATENT DOCUMENTS

| | | | |
|---|---|---|---|
| 2013/0044659 A1 | 2/2013 | Jokimies | |
| 2013/0044661 A1* | 2/2013 | Jokimies | H04W 52/0274 |
| | | | 370/311 |
| 2014/0301263 A1 | 10/2014 | Ji | |
| 2015/0003311 A1 | 1/2015 | Feuersaenger | |
| 2015/0305056 A1* | 10/2015 | Vangala | H04L 1/1832 |
| | | | 455/450 |
| 2016/0374022 A1 | 12/2016 | Ang | |
| 2018/0227856 A1* | 8/2018 | Yang | H04W 52/0219 |
| 2019/0239189 A1* | 8/2019 | Hwang | H04W 52/0229 |

OTHER PUBLICATIONS

3GPP TSG RAN WG1 Meeting #88 R1-1702096, CATT, "Wakeup signal for on-demand access for UE power saving in NR system design", Feb. 2017, 3 pages.
3GPP TSG-RAN WG1 #86 R1-166368, Qualcomm Incorporated, "UE Power Consideration based on Days-of-Use", Aug. 2016, 5 pages.
3GPP TSG-RAN WG1 #86bis R1-1610135, Qualcomm Incorporated, "Evaluation of Frame Structure Design for UE Power", Oct. 2016, 7 pages.
3GPP TSG-RAN WG1 NR AdHoc, R1-1700820, Qualcomm Incorporated, "UE Power Evaluation for DRX with Wake-Up Signaling" Jan. 2017, 7 pages.
3GPP TSG-RAN WG1 NR AdHoc, R1-1700821, Qualcomm Incorporated, "WF on evaluation for wake-up signal", Jan. 2017, 3 pages.
3GPP TSG-RAN WG2 Meeting #96 R2-168612, Qualcomm Incorporated, "Wake-Up Schemes for DRX in NR", Nov. 2016, 4 pages.
Huawei, HiSilicon, "Upper range for extended DRX," 3GPP TSG-RAN WG2 #90 R2-152506, May 25-29, 2015, pp. 1-2.
Qualcomm Incorporated, "UE Power Evaluation for DRX with Wake-Up Signaling", 3GPP TSG-RAN WG1 #87, R1-1612068, Nov. 14-18, 2016, pp. 1-7, Reno, NV USA.
LG Electronics Inc., "Inter-cell discovery support", R2-142641, 3GPP tsg_ran\ WG2_RL2, May 10, 2014, pp. 1-2.

* cited by examiner

WAKE UP SIGNALS OPERATION

CROSS-REFERENCE TO RELATED APPLICATIONS

This application is the National Stage Application of International Patent Application no. PCT/US2018/031112 filed May 4, 2018, which claims the benefit of U.S. Provisional Application No. 62/501,181 filed May 4, 2017, the contents of which are hereby incorporated by reference in their entirety.

BACKGROUND

3rd Generation Partnership Project (3GPP) TR 38.913—Study on Scenarios and Requirements for Next Generation Access Technologies; (Release 14), V0.2.0—defines scenarios and requirements for New Radio (NR) technologies. The Key Performance Indicators (KPIs) for eMBB, URLLC and mMTC devices are summarized in Table 1 below.

TABLE 1

KPIs for eMBB, URLLC and mMTC Devices

| Device | KPI | Description | Requirement |
|---|---|---|---|
| eMBB | Peak data rate | Peak data rate is the highest theoretical data rate which is the received data bits assuming error-free conditions assignable to a single mobile station, when all assignable radio resources for the corresponding link direction are utilized (i.e., excluding radio resources that are used for physical layer synchronization, reference signals or pilots, guard bands and guard times). | 20 Gbps for downlink and 10 Gbps for uplink |
| | Mobility interruption time | Mobility interruption time means the shortest time duration supported by the system during which a user terminal cannot exchange user plane packets with any base station during transitions. | 0 ms for intra-system mobility |
| | Data Plane Latency | For eMBB value, the evaluation needs to consider all typical delays associated with the transfer of the data packets in an efficient way (e.g. applicable procedural delay when resources are not pre-allocated, averaged HARQ retransmission delay, impacts of network architecture). | 4 ms for UL, and 4 ms for DL |
| URLLC | Control Plane Latency | Control plane latency refers to the time to move from a battery efficient state (e.g., IDLE) to start of continuous data transfer (e.g., ACTIVE). | 10 ms |
| | Data Plane Latency | For URLLC the target for user plane latency for UL and DL. Furthermore, if possible, the latency should also be low enough to support the use of the next generation access technologies as a wireless transport technology that can be used within the next generation access architecture. | 0.5 ms |
| | Reliability | Reliability can be evaluated by the success probability of transmitting X bytes (1) within 1 ms, which is the time it takes to deliver a small data packet from the radio protocol layer 2/3 SDU ingress point to the radio protocol layer 2/3 SDU point of the radio interface, at a certain channel quality (e.g., coverage-edge). NOTE1: Specific value for X is FFS. | $1-10^{-5}$ within 1 ms. |
| mMTC | Coverage | "Maximum coupling loss" (MCL) in uplink and downlink between device and Base Station site (antenna connector(s)) for a data rate of [X bps], where the data rate is observed at the egress/ingress point of the radio protocol stack in uplink and downlink. | 164 dB |
| | UE Battery Life | User Equipment (UE) battery life can be evaluated by the battery life of the UE without recharge. For mMTC, UE battery life in extreme coverage shall be based on the activity of mobile originated data transfer consisting of [200 bytes] Uplink (UL) per day followed by [20 bytes] Downlink (DL) from Maximum Coupling Loss (MCL) of x number dB, assuming a stored energy capacity of [5 Wh], | 15 years |
| | Connection Density | Connection density refers to total number of devices fulfilling specific Quality of Service (QoS) per unit area (per km2). QoS definition should take into account the amount of data or access request generated within a time t_gen that can be sent or received within a given time, t_sendrx, with x % probability. | $10^6$ devices/km2 |

FIG. 1 is a diagram of an example of discontinuous reception (DRX) cycles and user equipment (UE) behaviors 100. In Long-Term Evolution (LTE) and LTE Advanced (LTE-A), a UE in RRC_CONNECTED state may monitor the Physical Downlink Control Channel (PDCCH) to get a downlink transmission grant for it to receive downlink data on the Physical Downlink Shared Channel (PDSCH). The Connected state DRX procedure is introduced in LTE/LTE-A standards to achieve UE power saving. A DRX cycle comprises of an On Duration 190 and a DRX period. During On Duration 190, a UE monitors the PDCCH for a grant. Whenever a grant is received 191, the UE starts an Inactive Timer. The UE keeps monitoring the PDCCH 195 until the Inactivity Timer expires 197 or is stopped by a MAC command. The UE then enters a DRX period (e.g., the Short DRX cycle 193 or Long DRX cycle 196 in which the UE may go into the sleep mode 192, 194 to save power). During the sleep mode 192, 194 portions of the DRX period, the UE may power down its receiver.

FIG. 2 is a diagram of an example DRX cycle in which no grant is received 200. A DRX cycle in which no grant is received is the Connected Mode DRX (CDRX) state 201. A DRX cycle where a grant is received is considered an Active state. In CDRX cycles, the UE may perform the following: wake up from a sleep 202; spend the time and energy on ramp-up 203 from sleep 202; monitor the PDCCH for ON duration 204; ramp down 205; and go back to sleep 202.

R1-1700820, UE Power Evaluation for DRX with Wake-Up Signaling, Qualcomm Incorporated, provides the following summary of the modem power states:

| Modem Power States | Description |
| --- | --- |
| Active: PDCCH-only (Inactivity timer activated and not expired) | Assuming DRX is configured and UE is in connected mode, this state corresponds to the condition that UE's inactivity timer has started and not expired. For the purpose of this analysis, the associated ON duration is also considered part of this state. The UE is monitoring PDCCH by decoding within the search space every subframe (SF), but there is no grant. If the UE is capable of microsleep, it would go into brief sleep until the next subframe. |
| Active: Data (Inactivity timer activated and not expired) | Assuming DRX is configured and UE is in connected mode, for which UE is active, similar to the above state, but UE gets a grant for data (PDSCH or PUSCH). |
| CDRX (ON-duration-only cycle) | Assuming DRX is configured and UE is in connected mode, this state corresponds to UE going through a "grant-less" CDRX cycle (which includes ON duration followed by sleep duration). UE does not receive any grant during the ON duration, so its inactivity timer does not trigger. |

FIG. 3 is a diagram of examples of modem power states time weight distributions 300. In the example of FIG. 3, the YOUTUBE Time Weight Distribution example includes time for CDRX 301, active: PDCCH only 302, and active: data 303. The GOOGLE HANGOUT Time Weight Distribution example includes time for CDRX 306, active: PDCCH only 304, and active: data 305. The Web-browsing Time Weight Distribution example includes time for CDRX 309, active: PDCCH only 308, and active: data 307.

The following aspects of the UE energy consumption and power saving feature in NR have been discussed for 5G NR in current 3GPP efforts: studying the impact of UE downlink (DL) reception energy consumption and considering the total power consumption focusing on DoU, e.g., UE decoding power consumption in the physical layer DL control blind decoding in lack of grant, in the slot with the data, in the data reception process, in the measurement, and in the synchronization signal (SS); and studying UE power reduction techniques.

FIG. 4 is an example of a Wake-up Signal (WUS) without a grant during the DRX cycle 400. Wake-up Signals along with CDRX have been discussed as potential solutions for further reducing UE power consumption. In the example of FIG. 4, a gNB (i.e. a next generation NB) may send a WUS 401, 402 to a UE before the start of the ON duration 404 of the DRX cycle 405 as indicated by the WUS signal offset 403. The UE may wake up only its low-power WUS receiver to detect the WUS 401, 402. The main receiver of the UE may remain off to save power. The WUS may indicate to the UE whether it should expect a grant during the upcoming ON duration 404. If no grant is expected, the UE may go back to sleep and skip the ON duration. If the energy expended to receive the WUS is substantially lower than the energy to get through the ON duration, power consumption for that CDRX state may be reduced. Because there may be benefits for using a WUS, such as reduced UE power consumption, there is a need for WUS design for NR.

SUMMARY

Techniques for improved wake-up signal (WUS) operation in a wireless communication system are described.

In accordance with one example, a wireless communications device may receive, from a gNB, information indicating parameters associated with a wake-up signal time window. The wireless communications device may power down a first receiver and a second receiver of the wireless communications device based on a discontinuous reception (DRX) cycle. The wireless communications device may wake up the second receiver of the wireless communications device to receive, from the gNB, a wake-up signal during a configured WUS time window. The wireless communications device may determine whether the received wake-up signal indicates a wake-up or a non-wake-up condition. If the received wake-up signal indicates a wake-up condition, then the wireless communications device may wake up the first receiver of the wireless communications device before an on duration of the DRX cycle to synchronize timing with the gNB, detect a new radio physical downlink control channel (NR-PDCCH) during the on duration of the DRX cycle, and reset a size of the wake-up signal time window. If the received wake-up signal indicates a non-wake up condition, the wireless communication device may determine whether the received wake-up signal indicates criteria associated with a forced wake-up condition.

In accordance with another example, a wireless communications device may initialize parameters associated with a wake-up signal time window and initialize a counter of signals received indicating non-wake up. The wireless communication device may detect, during a next configured WUS time window, a received wake-up signal. The wireless communications device may determine whether the received wake-up signal indicates a wake-up or a non-wake-up condition. If the received wake-up signal indicates a wake-up condition, then the wireless communications device may (i) wake up a receiver of the wireless communication device to detect a new radio physical downlink control channel (NR-PDCCH) during a discontinuous reception (DRX) on duration; (ii) reset the counter of signals indicating non-wake up; and (iii) reset a size of a next extended WUS time window to a basic window size plus a time drift caused by one DRX cycle. If the wake-up signal indicates a non-wake up condition, the wireless communications device may (i) increment the counter, and (ii) adjust the size of the next extended WUS time window.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION OF ILLUSTRATIVE EMBODIMENTS

Figure 1:
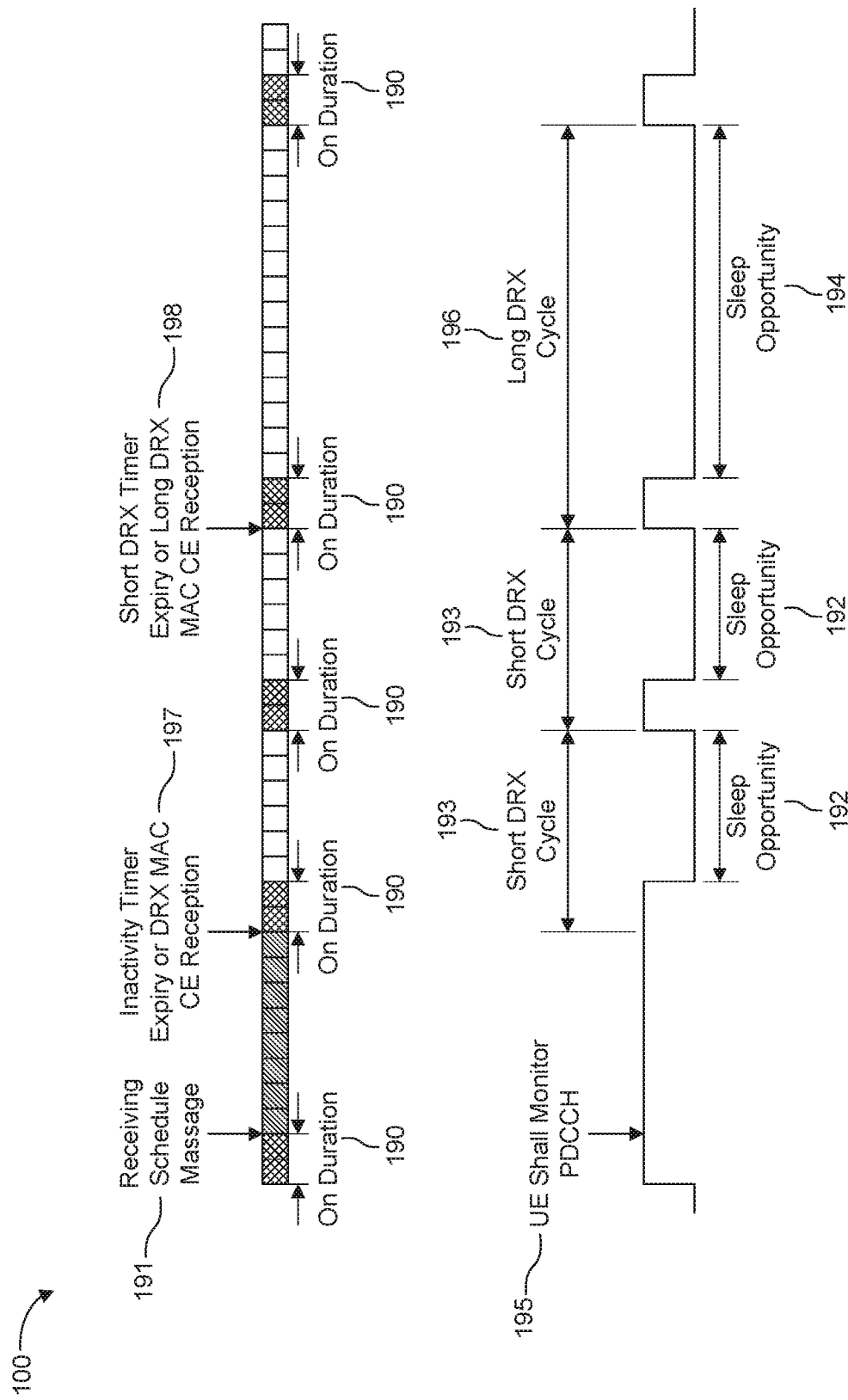
FIG. 1 is a diagram of an example of Discontinuous Reception (DRX) cycles and user equipment (UE) behaviors.
Figure 2:
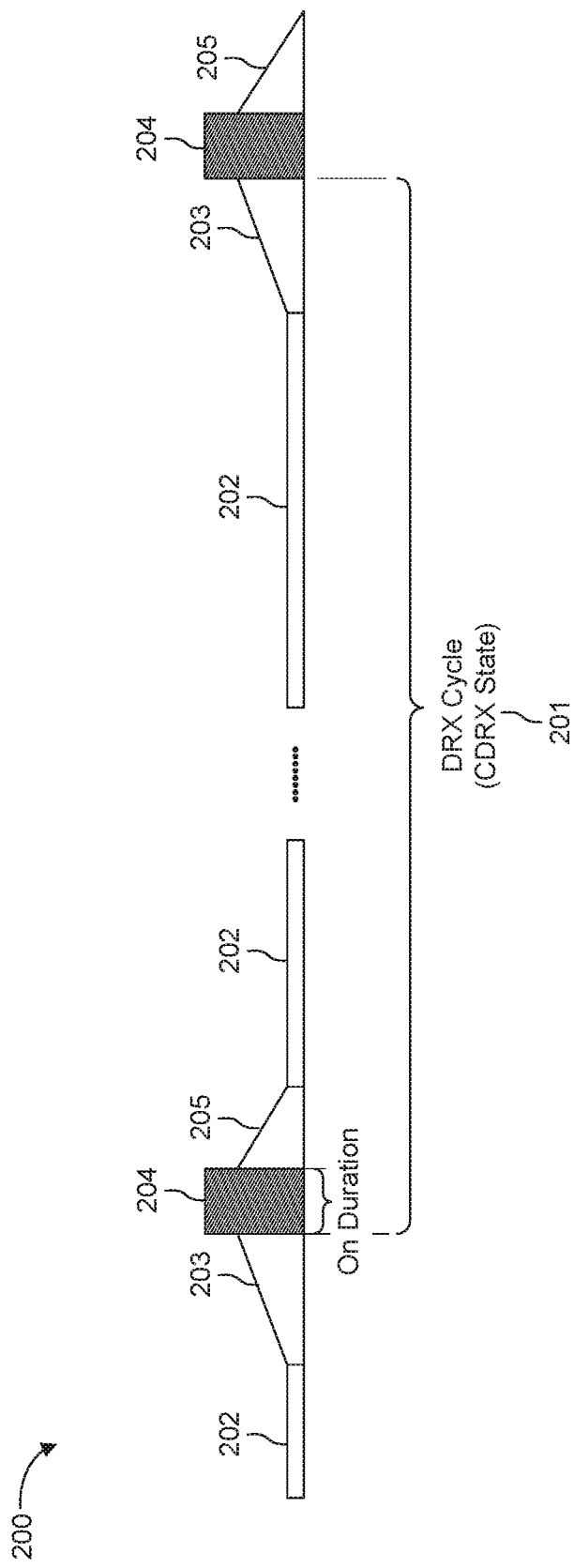
FIG. 2 is a diagram of an example DRX cycle in which no grant is received.
Figure 3:
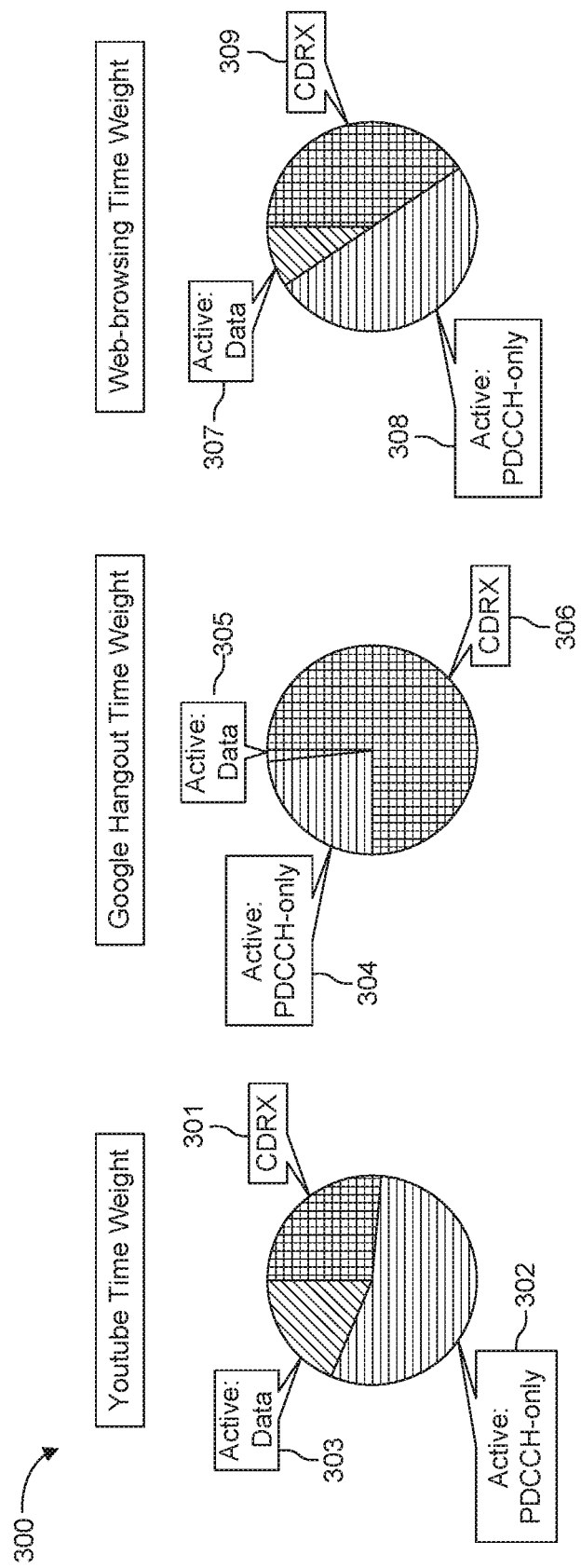
FIG. 3 is a diagram of examples of modem power states time weight distributions.
Figure 4:
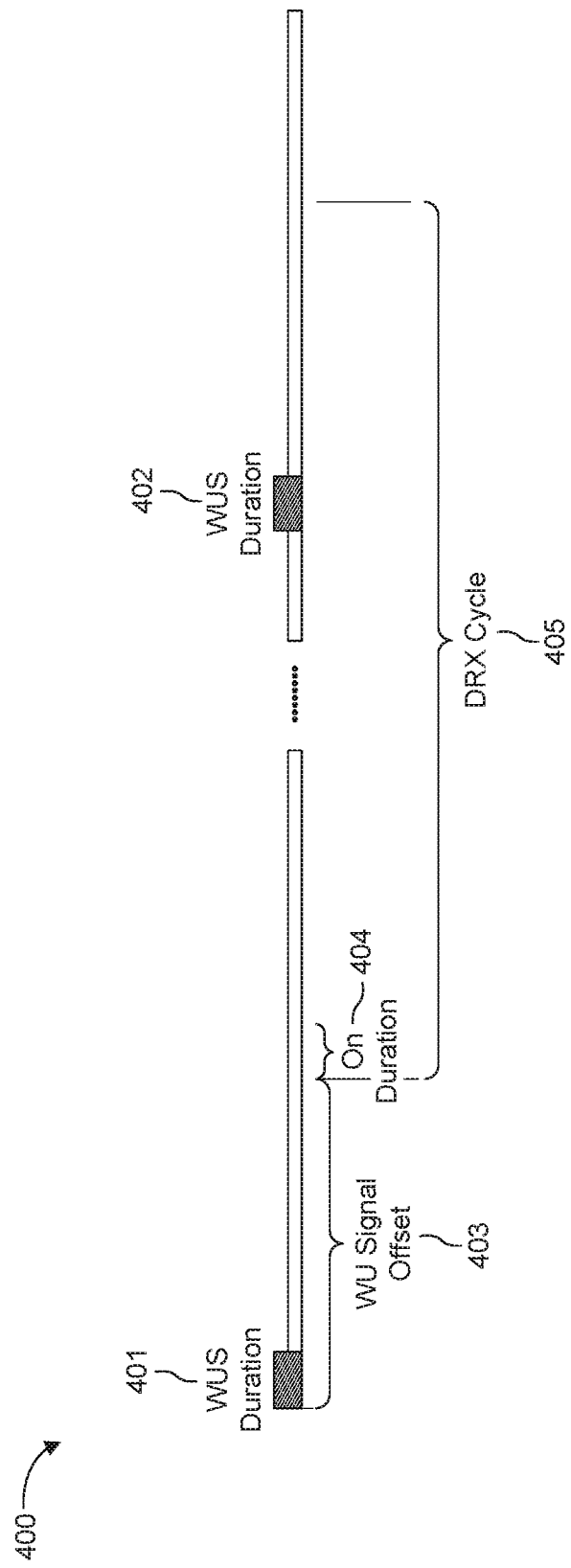
FIG. 4 is an example of a Wake-up Signal (WUS) without a grant during the DRX cycle.

Methods and apparatuses are described herein for improved wake-up signal (WUS) operation in a wireless communication system. In the embodiments described herein, user equipment (UE), wireless communications device, and wireless transmit/receive unit (WTRU) may be used interchangeably, without limitation, unless otherwise specified.

The following abbreviations and acronyms may be used throughout the description below:
A/N Ack/Nack
BRS Beam Reference Signal
CE Control Element
DL Downlink
DRX Discontinuous Reception
eMBB enhanced Mobile Broadband
ETWS Earthquake and Tsunami Warning System
HARQ Hybrid Automatic Repeat Request
KPI Key Performance Indicators
LTE Long term Evolution
MAC Medium Access Control
MIB Master Information Block
mMTC massive Machine Type Communication
NACK Non-ACKnowledgcmont
NR New Radio
PBCH Physical Broadcast Channel
PDCCH Physical Downlink Control Channel
PDSCH Physical Downlink Shared Data Channel
PRACH Physical Random Access Channel
PRB Physical Resource Block
RAN Radio Access Network
RNTI Radio Network Temporary Identifier
RRC Radio Resource Control
SI System Information
SIB System Information Block
TDD Time Division Duplex
UE User Equipment
UL Uplink
URLLC Ultra-Reliable and Low Latency Communications
WUS Wake-up Signal(s)

The 3GPP develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories:

enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

The methods and apparatuses described herein address several aspects of WUS design for NR. First, UEs that use a WUS may keep the lower-power WUS receiver on and keep the main receiver off. If the WUS does not wake up the UE for a few DRX cycles (due to no data to receive), it may cause issues in terms of timing, measurement/mobility and beam management. Over time, a timing difference between lower-power WUS receiver's clock and gNB clock may become large and may cause a timing mismatch for WUS reception. When the main receiver is turned off, the UE may not perform mobility related functions (such as, for example, handover or neighboring cell discovery) or beam management. In order to address these issues, a design for synchronization for wake up signals, which includes but is not limited to the following features, is described herein: a WUS reception timing window that may be used to accommodate timing mismatch; a WUS that carries timing information in an implicit and/or an explicit way; and a procedure to "force" the UE to wake-up to maintenance synchronization.

Furthermore, in order to enable wake-up signal and associated wake-up procedures, the following design aspects are described herein: WUS transmission channels (including cases in which the data channel is above or below 6 GHz); preventing inter-cell wake-up signals from waking up UEs accidently; communicating a UE's WUS capability to the network; and configuring/setting up WUS parameters (including but not limited to periodicity, timing offset, etc.) between UE(s) and the gNB. In order to address these issues, a design to enable a WUS and associated wake-up procedures, which includes but is not limited to the following features, is described herein: defining a WUS transmission channel; defining WUS capability and signaling; WUS configuration (periodicity, timing offset and etc.), which may be part of a DRX configuration/negotiation with the network or configured separately; and a WUS procedure activation using RRC or other signaling.

Another issue addressed herein is that for a WUS, a miss-detection at the UE may happen, and the gNB and the UE may perceive the miss-detection differently. A WUS miss-detection may negatively impact DRX procedures and UE performance. In order to address these issues, solutions including but not limited to the following are described herein: gNB and UE behavior for recovering from a WUS miss-detection; and gNB and UE behavior for re-configuring WUS parameters upon WUS miss-detection statistics.

Another issue addressed herein is that for WUS, a false alarm may be detected, and the gNB and the UE may view the false alarm differently. WUS false alarm detections may negatively impact DRX procedures and UE performance. In order to address these issues, solutions including but not limited to the following are described herein: gNB and UE behavior to recover from WUS false-alarm detection; and gNB and UE behavior to re-configure WUS parameters (timing, window length, etc.) based on WUS false alarm detection statistics.

Yet another issue addressed herein is that for a cell with many active UEs, the WUS for each individual UE may consume large amounts of channel resources and increase overhead. In this case, a UE-specific WUS may be inefficient. The design of a WUS described herein (both signaling and procedures) balances efficiency and power savings for a group-based WUS design and procedures which may indicate which UEs may receive PDCCHs/grants in an upcoming ON duration.

Figure 5:
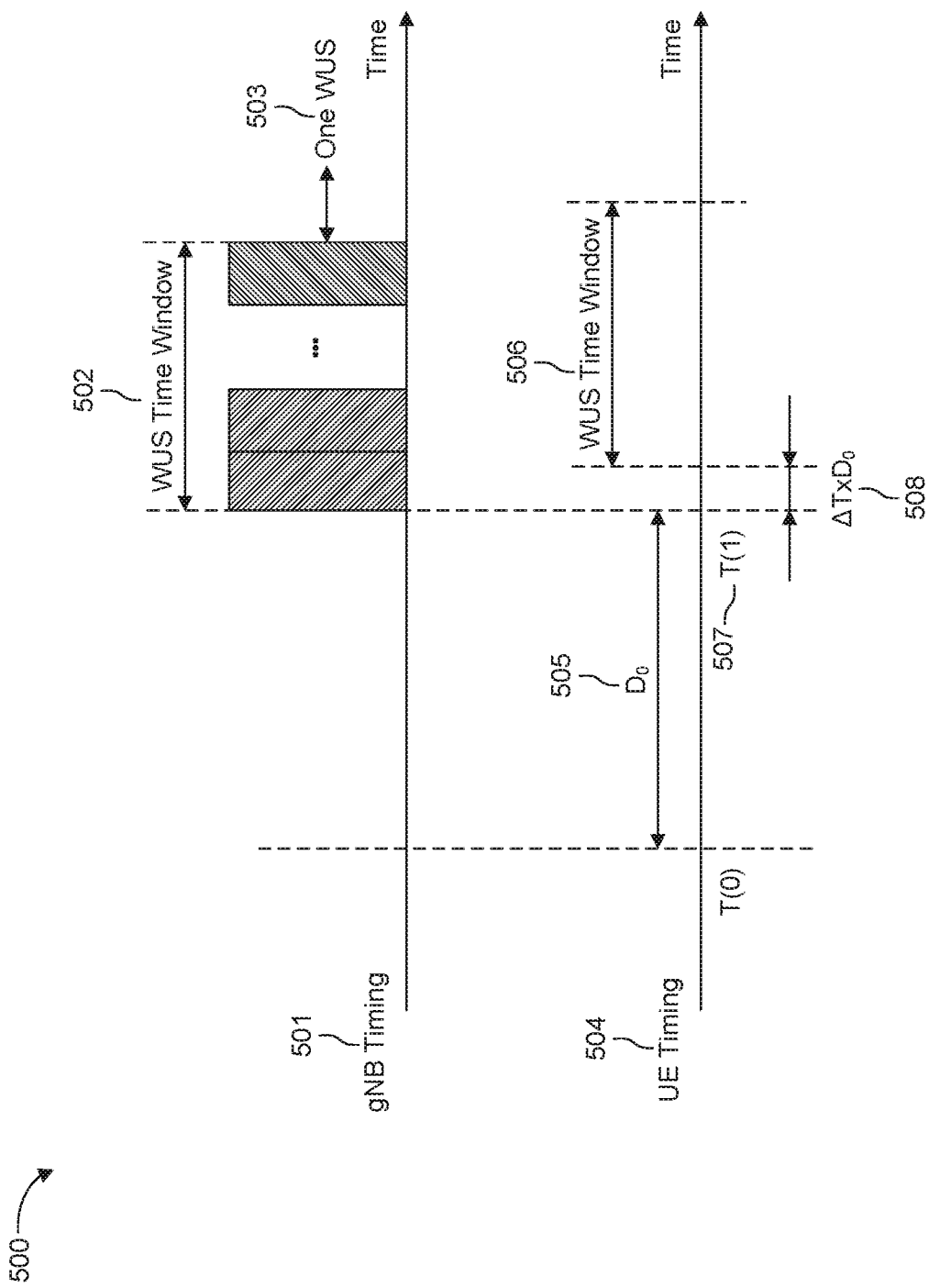
FIG. 5 is a diagram of an example WUS time window.

FIG. 5 is a diagram of an example WUS time window 500 in accordance with a first embodiment, which may be used in combination with any of the embodiments described herein. A basic WUS time window for a UE may be defined as the time duration during which a UE may monitor (in the case of an active WUS receiver, the UE turns on its low-power WUS receiver) or detect a WUS. Such a basic WUS time window may be configured using RRC signaling during WUS and/or DRX configuration for the UE. The configured wake-up time for the UE to detect a WUS may be $T(i)$ for a DRX cycle i, and the basic WUS time window length may be $W_b$. The UE may wake up and detect a WUS during time $\{T(i), T(i)+W_b\}$. The length of the basic WUS time window should at least cover the duration of one WUS ($T_{WUS}$). In other words, $W_b = k \cdot T_{WUS} + \text{margin}$. For a WUS time window with k>1, a WUS may be transmitted repeatedly k times to increase the UE detection reliability and robustness. The WUS length (in terms of OFDM symbols) and resources definition are described below.

Due to the gNB and UE low-power WUS receiver clock drifting problem, the timing mismatch between them will increase overtime. The example of FIG. 5 shows the UE timing 504 and gNB timing 501. The gNB WUS time window 502 and UE WUS time window 506 may begin after time $D_0$ 505 at time $T(1)$ 507. One or more wake-up signals 503 may be transmitted during gNB WUS time window 502. As shown in the example of FIG. 5, a timing mismatch, $\Delta T \times D_0$ 508, may occur between the start of the gNB WUS time window 502 and UE WUS time window 506.

In accordance with one embodiment, an extended WUS time window may be used to accommodate this timing drift problem. The extended WUS time window's duration may be denoted by $W_{ext}(i)$, and an effective starting time of the WUS time window may be denoted by $T_{eff}(i)$. The corresponding time window for DRX cycle i may be $\{T_{eff}(i), T_{eff}(i)+W_{ext}(i)\}$. A WUS cycle may comprise a time period longer than one or more DRX cycles. If the clock drift between the gNB and UE low-power WUS receiver is $\Delta T$ per second, and the duration of DRX cycle i is $D_i$, then the following applies when updating WUS timing window parameters per WUS cycle:

$$W_{ext}(i) = W_{adj}(i-1) + 2 * \Delta T * D_{i-1}, T_{eff}(i) = T_{adj}(i-1) - \Delta T * D_{i-1} + D_{i-1}.$$

Figure 6:
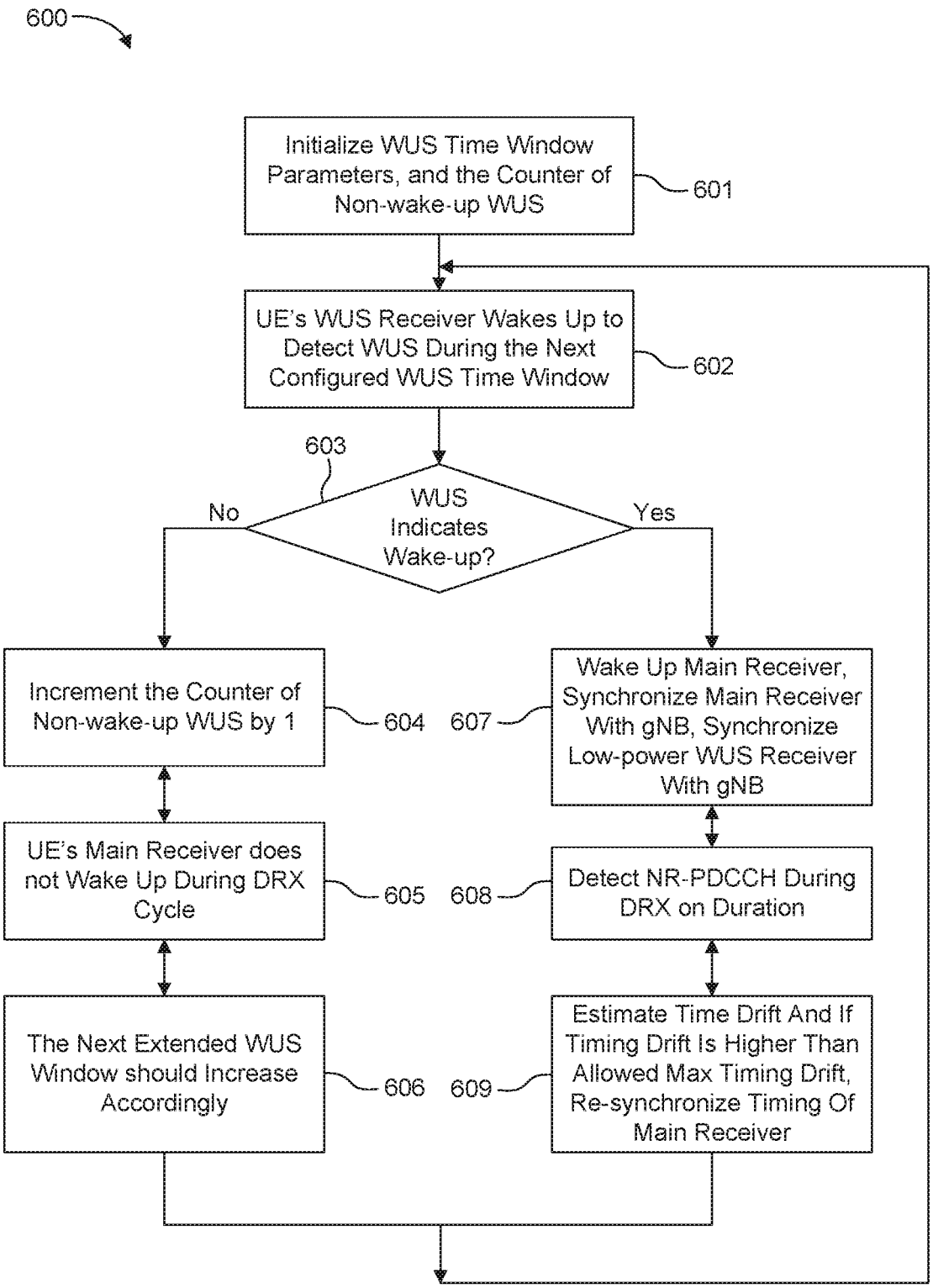
FIG. 6 is a diagram of an example WUS assisted DRX procedure for updating WUS time window parameters per WUS cycle.

FIG. 6 is a diagram of an example WUS assisted DRX procedure 600 for updating WUS time window parameters per WUS cycle in accordance with one embodiment, which may be used in combination with any of the embodiments described herein. While each step of the procedure 600 in FIG. 6 is shown and described separately, multiple steps may be executed in a different order than what is shown, in parallel with each other, or concurrently with each other. The procedure 600 is performed by a UE as an example, but the procedure 600 may also be performed by a wireless communications device, WTRU, or any other device described herein that is capable of wireless communications. Referring to FIG. 6, the WUS window parameters and the counter of consecutive non-wake-up WUS may be initialized (step 601). For example, the WUS window parameters may be initialized as $T_{adj}(0)=T_0$, $W_{ext}(0)=W_b$, and the counter of consecutive non-wake-up WUS may be initialized to 0. During the next configured WUS time window, the UE's low power WUS receiver may wake up to detect a WUS (step 602). The UE may process the detected WUS to see whether WUS indicates a "wake-up" (step 603).

If WUS indicates a "non wake-up", then the counter of non-wake-up WUS may be incremented by 1 (step 604). The WUS time window parameters may be adjusted as: $W_{adj}(i-1)=W_{ext}(i-1)$, and $T_{adj}(i-1)=T_{eff}(i-1)$. The parameters of the next WUS window may be set as $W_{ext}(i)=W_{adj}(i-1)+2*\Delta T*D_{i-1}$, $T_{eff}(i)=T_{adj}(i-1)-\Delta T*D_{i-1}+D_{i-1}$. The UE's main receiver does not wake up to detect NR-PDCCH during the DRX cycle (step 605), and the next extended WUS window increases accordingly (step 606).

If, instead, the WUS indicates a "wake-up", the UE may wake up, turn on its main receiver, synchronize its main receiver with gNB, synchronize its low-power WUS receiver with the gNb (step 607), and perform NR-PDCCH detection during the DRX on duration (step 608), and follow the rest of DRX procedures. The WTRU may be configured with an allowed maximum time drift ΔTmax value, which the WTRU may use to decide whether or not to synchronize its timing upon turning on its main receiver. The UE may estimate its time drift and if the estimated time drift is higher than ΔTmax, the UE may synchronize its timing upon turning on its main receiver (step 609). Otherwise, the WTRU may not re-synchronize its timing.

Before the UE turns off again its main receiver and goes to sleep, the UE may initiate the WUS assisted DRX procedure 600.

Procedures for synchronizing a low-power WUS receiver and a gNB are described herein in accordance with another embodiment. Procedures for synchronizing a low-power WUS receiver and a gNB may prevent the timing and frequency drift between the gNB and the low-power WUS receiver at the UE from becoming too large. One or more triggering criteria for a "forced" wake up of the UE are also described herein. One example of such a criterion is that the last N consecutive wake-up signals for a UE may indicate "do not wake up." In other words, the UE may not wake up for the last N consecutive WUS cycles based on the received WUS. Another example of "forced" wake up" triggering criterion is that the number of wake-ups of the UE is less than K times in the past N WUS cycles. The UE may wake up at least K times out of N DRX cycles. Another example of "forced" wake-up triggering criterion is that the estimated time drift is higher than the allowed maximum time drift ΔTmax.

Figure 7:
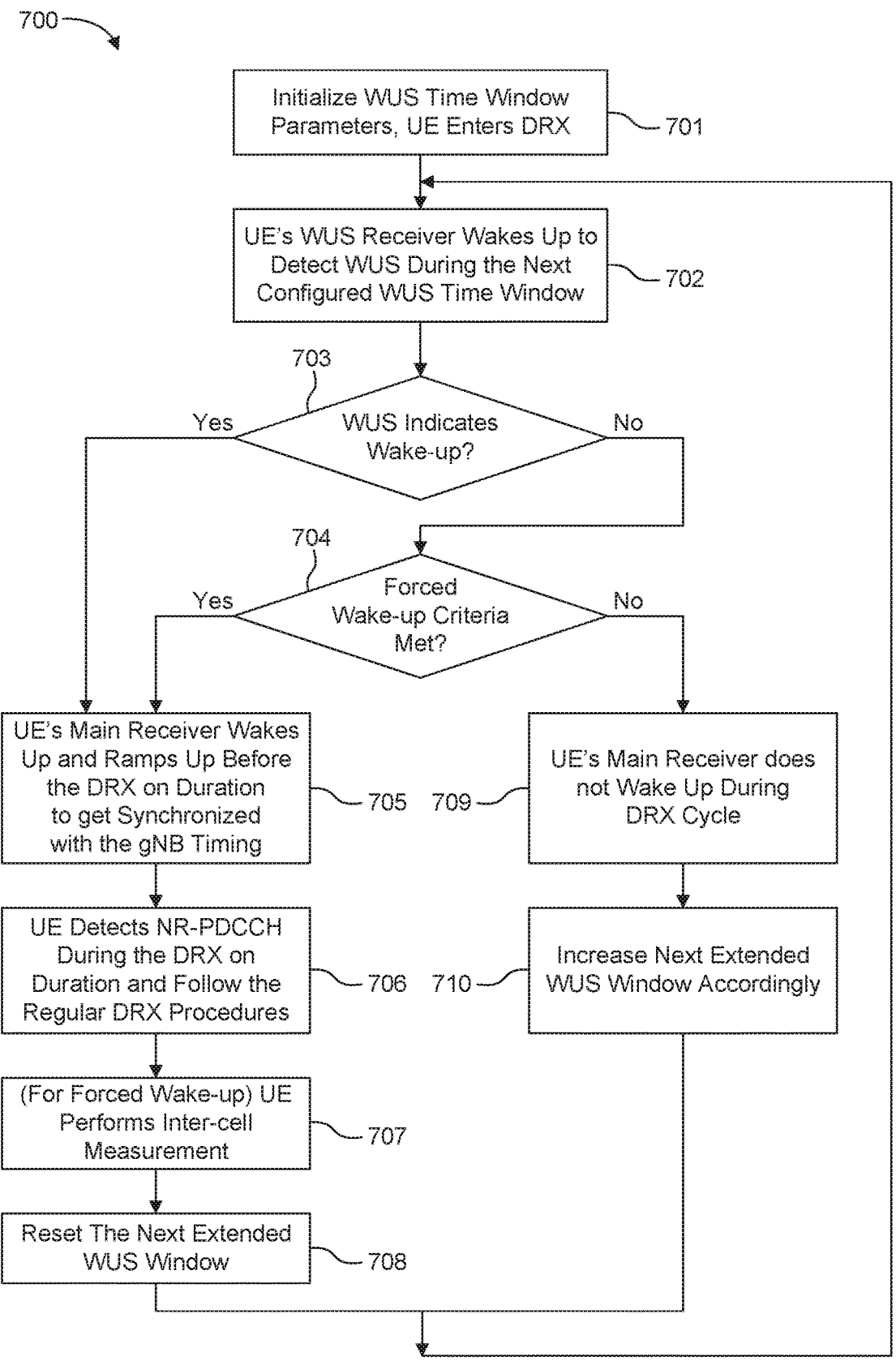
FIG. 7 is a diagram of an example procedure for a NR-PDCCH based WUS synchronization procedure.

FIG. 7 is a diagram of an example procedure for a NR-PDCCH based WUS synchronization procedure 700 in accordance with one embodiment, which may be used in combination with any of the embodiments described herein. While each step of the procedure 700 in FIG. 7 is shown and described separately, multiple steps may be executed in a different order than what is shown, in parallel with each other, or concurrently with each other. The procedure 700 is performed by a UE as an example, but the procedure 700 may also be performed by a wireless communications device, WTRU, or any other device described herein that is capable of wireless communications. Referring to FIG. 7, the UE may initialize WUS time window parameters and may enter DRX (step 701). The UE may wait until the next configured WUS time window and then wake up the WUS receiver to detect a WUS during the next configured WUS time window (step 702). The UE may then determine whether the WUS indicates a wake-up (step 703). The UE may take different actions depending on the received WUS.

If the received WUS indicates "no wake-up", the UE may check whether the triggering criteria of forced wake-up is met (step 704). If the triggering criteria of forced wake-up is met, the UE may wake up its main receiver and ramp up its main receiver and get timing and frequency synchronized with gNB timing before the beginning of the DRX on duration in the DRX cycle (step 705). For example, upon receiving the N-th WUS indicating "no wake-up", the force wake-up procedure may ignore the "no wake-up" indication in the received WUS indicating no-wakeup, and wake up the UE's main receiver. If, on the other hand, the received WUS indicates "wake-up", then the UE may perform step 705 (i.e., wake up).

The UE may detect NR-PDCCH during the DRX on duration and follow the regular DRX procedures (if forced wake-up criteria has been previously met, this step may be skipped since the received WUS already indicates that no NR-PDCCH will be received by the UE) (step 706).

For forced wake-up, the UE may also use this "forced" wake-up to perform inter-cell measurements on neighboring cells' DL signals (such as the SS and/or reference signal (RS)) to obtain the received signal quality from the neighboring cells (step 707). For example, the UE may perform inter-cell measurements after the ramp-up in step 705 (right before the beginning of its DRX on duration). If received signal quality of neighboring cell is better than the current serving cell, then the process to handover to the detected target cell may be initiated. After forced wake-up, the UE may reset the next extended WUS timing window size and return to a normal WUS-DRX cycle (step 708).

If the triggering criteria of force wake-up is not met, the UE may not wake up the main receiver (step 709). The next extended WUS time window may then be increased accordingly (step 710). The UE may then return to step 702.

Figure 8:
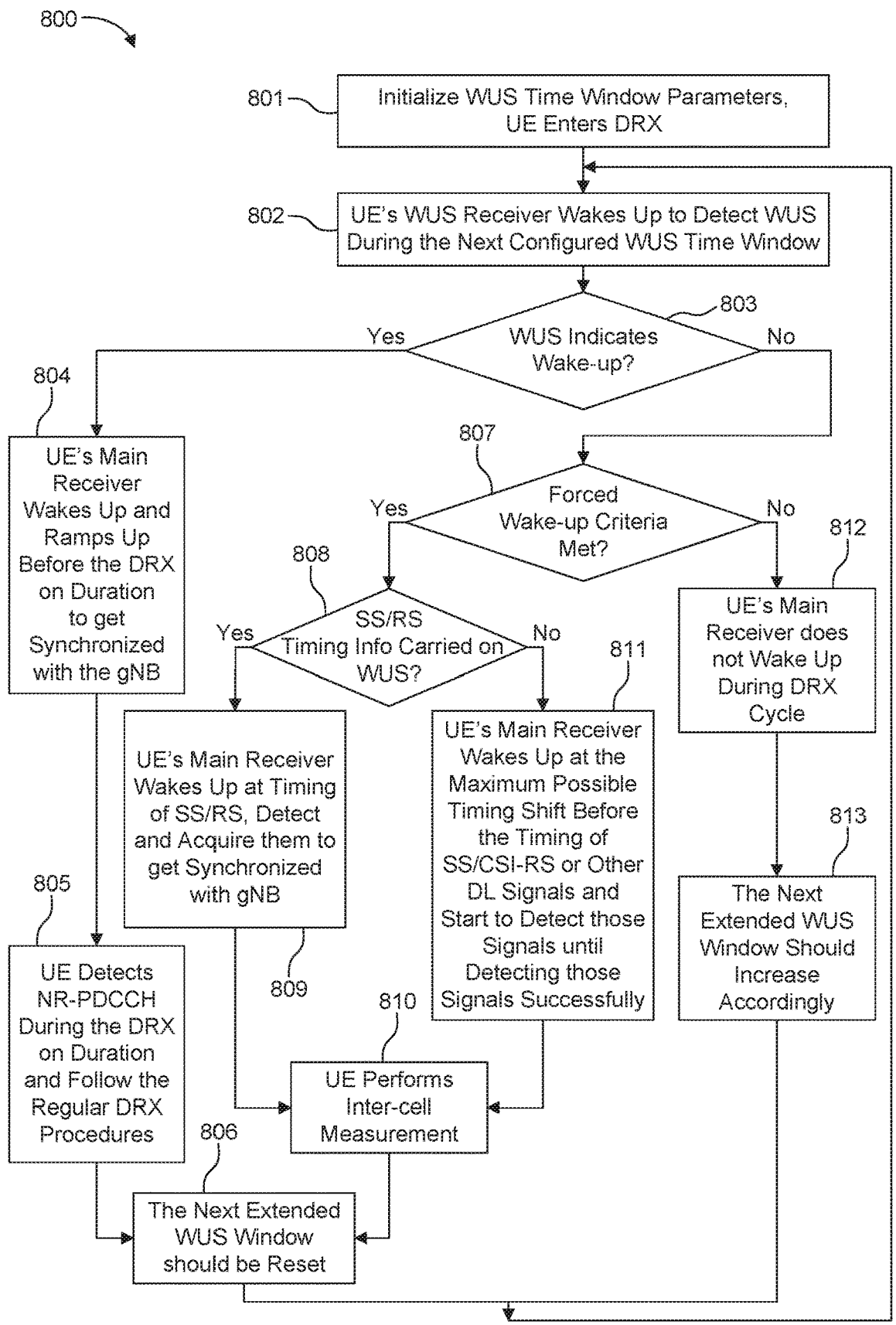
FIG. 8 is a diagram of an example procedure for a SS/RS based WUS synchronization procedure.

FIG. 8 is a diagram of an example procedure for a SS/RS based WUS synchronization procedure 800 in accordance with one embodiment, which may be used in combination with any of the embodiments described herein. While each step of the procedure 800 in FIG. 8 is shown and described separately, multiple steps may be executed in a different order than what is shown, in parallel with each other, or concurrently with each other. The procedure 800 is performed by a UE as an example, but the procedure 800 may also be performed by a wireless communications device, WTRU, or any other device described herein that is capable of wireless communications. In the example of FIG. 8, the N-th non-wake-up WUS may carry additional information of next SS or RS resources or measurement slots in which the UE may measure and for which the UE may obtain DL timing and frequency. For example, such a WUS may contain a timing offset to next SS or RS resources or measurement slots.

Referring to FIG. 8, the UE may initialize WUS time window parameters and may enter DRX (step 801). The UE may wait until the next configured WUS time window and then wake up the WUS receiver to detect a WUS during the next configured WUS time window (step 802). The UE may then determine whether the WUS indicates a wake-up (step 803). The UE may take different actions depending on the received WUS.

If the received WUS indicates "wake-up", the UE may ramp-up its main receiver and get timing and frequency synchronized before the beginning of the DRX on duration in the DRX cycle (step 804). The UE may detect NR-PDCCH during the DRX on duration and follow the regular DRX procedures (step 805). The UE may reset the next extended WUS timing window size (step 806). The UE may then return to step 802.

If the received WUS indicates "no wake-up", the UE may check whether the triggering criteria of forced wake-up is met (step 807). If the triggering criteria of forced wake-up is met, the UE may check if received WUS carries SS/RS information (timing and etc.) (step 808). If the WUS carries SS/RS information (timing and etc.), the UE may wake up at the exact timing indicated by the SS/RS information carried in the received WUS to detect and process SS/CSI-RS and/or other DL signals of its serving cell to obtain DL timing/frequency synchronization and perform beam pair link management or beam correspondence (step 809). The UE may also use this "forced" wake-up to perform measurements of neighboring cells' DL signals (such as SS and RS) to obtain the received signal quality from the neighboring cells (step 810). For example, the UE may perform inter-cell measurement after the ramp-up in step 804 (right before the beginning of its DRX on duration). If received signal quality of neighboring cell is better than the current serving cell, then the process to handover to the detected target cell may be initiated. After forced wake-up the UE may reset the next extended WUS timing window size and return to a normal WUS-DRX cycle (step 806).

If the received WUS does not carry SS/RS information (timing and etc.) (step 808), the UE may wakes up the main receiver at the maximum possible timing shift before the timing of SS/CSI-RS or other DL signals of its serving cell and start to detect those signals until detecting those signals successfully (step 811). This may help the UE to obtain DL timing/frequency synchronization and perform beam pair link management or beam correspondence. The UE may then perform inter-cell measurements (step 810).

If the triggering criteria for force wake-up is not met, the UE may not wake up its main receiver (step 812). The next extended WUS time window may then be increased accordingly (step 813). The UE may then return to step 802.

Since the clock drift between the gNB and UE's low power WUS receiver may cause timing ambiguity over time, a WUS may carry timing information in an implicit or explicit way to eliminate the timing ambiguity. For example, the WUS may carry timing information comprising an OFDM symbol index (within a subframe). Upon successfully detecting a valid WUS, the UE may obtain the OFDM symbol index relative to the subframe boundary, and therefore may derive the DL timing. Depending on scale of time drift, the WUS may carry other timing information of different time resolutions.

In accordance with another embodiment, the channel bandwidth of WUS detection for the UE is defined. In order to reduce the energy consumption during WUS detection, the WUS transmission channel for a UE may be a narrow band channel with a bandwidth BWi. Such a WUS transmission channel can be either in the same band of data transmission or a separate channel (to allow <6 GHz band WUS for mmW band). The WUS transmission channel configuration may be signaled in WUSInfo, which may be either a separate IE or a field within another IE. WUSInfo may be carried in a DRX configuration message. A configured location may be used for the UE to detect the WUS, which may result in saved power. If multiple locations are used, the locations may be used to implicitly signal the upcoming PDCCH timing information to achieve further power savings.

Different lengths (in terms of number of OFDM symbols) may be defined, and a UE may be configured with a UE specific WUS length by the network using higher layer signaling or MAC CE.

The following is an example of a WUSInfo data structure:

```
WUSInfo              SEQUENCE {
  WUS-CarrierFreq    ARFCN-ValueEUTRA       OPTIONAL,  -- Need OP
  WUS-Bandwidth      ENUMERATED {BW1, BW2, ..., BWK}  OPTIONAL,  --
Need OP
  WUS-TimeDuration   ENUMERATED {NumSymbol1, NumSymbol2, ...,
NumSymbolK}  OPTIONAL,  -- Need OP
  WUS-resources     ENUMERATED {Resource1, Resource2, ..., ResourceK}
OPTIONAL,  -- Need OP
}
```

In accordance with another embodiment, the WUS capability may be part of UE capability. It may be either a separate IE or a field within another IE. The UE-WUSInfo IE may contain UE capability information needed for WUS functions and procedures. An example UE-WUSInfo information element may comprise the following:

```
-- ASN1START
UE-WUSInfo-r15 ::=        SEQUENCE {
  WUS-Support             ENUMERATED {true, false}   OPTIONAL,
  WUS-ChannelBandwidth  ENUMERATED {BW1, BW2, ..., BWK}
  OPTIONAL,
  WUS-OtherParamters      ENUMERATED {SupportedWUStype1, ...,
SupportedWUStypeK}         OPTIONAL,
  ...
}
-- ASN1STOP
```

Alternatively, the UE capability of WUS may be a field within the general UE capability IE, for example, UECapabilityInformation. The UE WUS capabilities may be signaled to the network using an RRC message, which may be for example upon request by the network.

Yet another embodiment relates to WUS configuration signaling. The procedures and parameters of WUS for a UE may be related to a DRX procedure of the UE. Therefore, WUS parameters (periodicity, timing offset and etc.) may be included as a part of DRX configuration, as follows:

```
-- ASN1START
DRX-Config-v15 ::=     SEQUENCE {
  DRX parameters        ...
  ...
  WUS-Timingoffet       ENUMERATED {TO_1, TO_2, ..., TO_K} OPTIONAL,
  WUS-OtherParamters    ENUMERATED {WUSWindowLength_1, ...,
WUSWindowLength_M}          OPTIONAL,
  ...
}
-- ASN1STOP
```

Alternatively, the contents for WUS may be configured separately in a separate IE or a field in another IE, as follows:

```
-- ASN1START
WUS-Config-v15 ::=    SEQUENCE {
  WUS-Timingoffet     ENUMERATED {TO_1, TO_2, ..., TO_K} OPTIONAL,
  WUS-OtherParamters  ENUMERATED {...}                   OPTIONAL,
  ...
}
-- ASN1STOP
```

Additional WUS design and configurations are described herein. Wake-up signals may comprise a digital sequence. A WUS may be UE specific, i.e. the WUS may be addressed to a specific UE. The identification used to address the UE may include, but is not limited to, any one of the following: IMSI, TMSI, GUTI, M-TMSI, S-TMSI, RAN notification area identification (i.e. the unique identification used to address the UE in NR Inactive (RRC INACTICE) state), and resume ID (or equivalent) (i.e. the E-UTRAN level UE unique identification used for the RRC connection resume procedure).

Wake-up signals may be UE group-based. In this case, the WUS may be addressed to a group of UEs. The identification used to address the UE may include, but is not limited to, any one of the following: WUS-RNTI, where a UE is configured with a group specific WUS-RNTI.

Wake-up signals may be cell specific. In this case, the WUS may not be specific to a UE or a group of UEs. The WUS may be similar to a cell-specific reference signal.

A UE may be configured with more than one type of WUS. In one embodiment, a UE may be configured with a UE specific WUS and a cell specific WUS. In another embodiment, a UE may be configured with a UE group-based WUS and a cell specific WUS. For example, in one embodiment, a UE may first use the cell specific WUS to decide whether the UE is under the coverage of a WUS and may therefore operate in WUS notification mode. Then, the UE may monitor the UE specific WUS or the UE group-based WUS to decide on whether to wake up and establish connection with the network.

A UE may monitor a WUS in various RRC states. For example, the UE may monitor the WUS in RRC_IDLE state or RRC_INACTIVE state. A gNB may configure a UE with a WUS (e.g. resource in time-frequency domain, configuration parameter set such as WUS duration for e.g. number of symbols, listening time internal including listening period and non-listening period, etc.) that is valid only for idle mode operation. For example, the UE may only monitor this WUS in RRC_IDLE state, which may be referred to herein as an idle mode WUS.

The gNB may also configure a UE with a WUS that is valid only for inactive mode operation. For example, a UE may only monitor this WUS in the RRC_INACTIVE state, which may be referred to herein as inactive mode WUS.

A UE may monitor the idle mode WUS in the RRC_IDLE state. A UE may monitor the inactive WUS in the RRC_INACTIVE state. The gNB may configure a UE with a WUS valid in both the RRC_IDLE state and the RRC_INACTIVE state, which may be referred to herein as the WUS IDLE INACTIVE WUS. In an example, the UE may monitor the IDLE INACTIVE WUS in the RRC_IDLE state or in the RRC_INACTIVE state.

The gNB may configure a UE with a WUS that is valid only in the RRC_CONNECTED state. For example, the UE may monitor the WUS in the RRC_CONNECTED state, which may be referred to herein as the RRC_CONNECTED WUS. The UE may monitor RRC_CONNECTED WUS in RRC_CONNECTED State.

The gNB may also configure a UE with a WUS that is valid in all RRC states and the UE may monitor such stateless WUS in any RRC state.

A UE that is configured to monitor a WUS may be able to differentiate a WUS addressed to the UE from a WUS addressed to other UEs. For example, a UE may be able to differentiate a WUS addressed only to that UE from a WUS addressed to other UEs or a group of UEs. A UE may be able to differentiate a WUS addressed to a group of UEs to which the UE belongs from a WUS addressed to other UEs or a group of UEs. A UE may be able to differentiate a serving cell WUS from a neighboring cell WUS.

An association between a WUS and a UE, i.e. the mechanism by which a UE may identify and differentiate a WUS addressed to that UE from a WUS addressed to other UEs or a group of UEs may be an implicit association or explicit association.

When there is an implicit association, the UE may not be explicitly configured with such an identification, but instead the UE may have implicitly derived the identification. For example, an identification may be implicitly derived from a physical cell ID.

A UE may be explicitly configured (e.g. via RRC signaling) with an identification mechanism used to identify and differentiate a WUS. For example, a WUS addressed to a UE may be scrambled with such an identification. A UE may determine that a WUS is addressed to it by detecting the identification scrambled with the received WUS. In another example, the UE may descramble the WUS with the identification signaled to the UE. If the descrambling of the WUS is successful, the UE may positively conclude that the WUS is intended to this UE.

The UE may be configured with more than one WUS identification. For example, for each type of WUS (e.g., a UE specific WUS versus a cell specific WUS), a UE may be configured with one identification for a UE specific WUS and one identification for a cell specific WUS.

The deployment of the WUS feature may be controlled by a WUS capability exchange between a UE and the network. For example, a UE may perform WUS capability signaling with the network.

The UE may indicate its WUS capability information to the network. For example, a UE may indicate its WUS capability information as part of the UE Radio capability information. The UE may provide WUS capability information to the core network during, for example, the initial attach procedure or tracking area update procedure. The core network may then distribute the information to the radio access network (RAN) during, for example, the initial context setup procedure. Alternatively, the UE may directly exchange its WUS capability information with the RAN.

The following UE reachability options or reachability modes of operation may be considered for WUS capable UEs:

The UE may be reachable only by means of a WUS. For example, a WUS and paging may not have the same coverage and as a result, the UE may be reachable by WUS but not by paging, and vice-versa.

The UE may be reachable only by means of paging, and therefore not reachable by WUS.

The UE may be reachable by either WUS or paging. This may be the case when the UE is in the coverage of both paging and WUS.

One issue that may arise is in maintaining up to date reachability information in both the UE and the network so that the UE may operate in a correct reachability mode. For example, there may be an issue in maintaining whether the UE is in a WUS reachability mode or in a paging reachability mode. In another example, a discrepancy in the reachability mode between the UE and the network may negatively impact UE performance in terms of power consumption, battery life, and network access latency. The UE may not be required to monitor both paging and the WUS as this would be inefficient.

A UE may monitor a WUS to determine if the UE can operate in WUS reachability mode. For example, a UE may monitor cell specific WUS for this purpose. The following two events may be defined: WUS reachability entry (event R1) and WUS reachability exit (event R2). A UE may inform the network of a WUS reachability event R1 or event R2. The UE may autonomously monitor event R1 and event R2 and report such event to the network. Conditions of such monitoring and reporting may be predetermined. Alternatively, the network may configure the UE with the event R1 and/or event R2, and the network may control how and when the UE monitor event R1 and/or event R2 as well as the reporting of such an event.

The UE may report a reachability event R1 or event R2 in response to paging from the network. The UE may report a reachability event R1 or event R2 during a tracking area update procedure. For example, the UE may report a reachability event R1 or event R2 when there is a change of tracking area or during an NR RAN notification area update (e.g. when the RAN notification area (aka RAN paging area in support of RRC_INACTIVE state) changes). The UE may report its WUS reachability status (i.e. event R1 or event R2) upon a request from the network.

In another embodiment, there may be triggers for the WUS Mode of operation and coordination between when UE monitors the WUS versus when the UE monitors paging. The network may configure the UE to operate in a specific reachability mode for WUS reachability mode or paging reachability mode. The UE monitor WUS or paging according to the reachability mode of operation configured by the network. The gNB, upon a trigger from the core network (idle mode paging message from the core network), may initiate transmission of a UE specific WUS upon determination that the UE need to be paged. This may be performed in order to reach the UE in the RRC_INACTIVE state or to bring RRC_CONNECTED UE from DRX.

A UE may also autonomously start operating in a WUS reachability mode upon event R1 and may report such an event to the network. The network may configure the UE to start operating in WUS reachability mode upon event R1.

A UE may also autonomously start operating in paging reachability mode upon event R2 and may report such an event to the network. The network may configure the UE to start operating in paging reachability mode upon event R2.

When the UE is configured by the network to operate in a WUS reachability mode and the UE cannot be reached by the WUS or subsequently becomes non-reachable by the WUS, the UE may take one or more of the following actions: set the WUS reachability event to R1; fallback to paging monitoring; inform the network of WUS reachability event R2 either immediately or at the next possible occasion, such as for example, in response to paging. The next possible occasion may also include connection to the network initiated by UE upper layer, for example, as a result of tracking area update, RAN area notification update, or UL data transmission.

When the UE is configured by the network to operate in paging reachability mode and the UE cannot be reached by paging or subsequently becomes non-reachable by paging, the UE may take one or more of the following actions: check WUS reachability event R1 and if reachable via the WUS, inform the network of WUS reachability event R1 either immediately or at the next possible occasion, such as for example, upon connection to the network initiated by UE upper layer. This may be a result of a tracking area update, RAN area notification update, or UL data transmission. For example, the case where the UL and the WUS are both deployed in a low frequency range (e.g. below 6 GHz), while the DL is deployed in higher frequency range (e.g. above 6 GHz).

Figure 9:
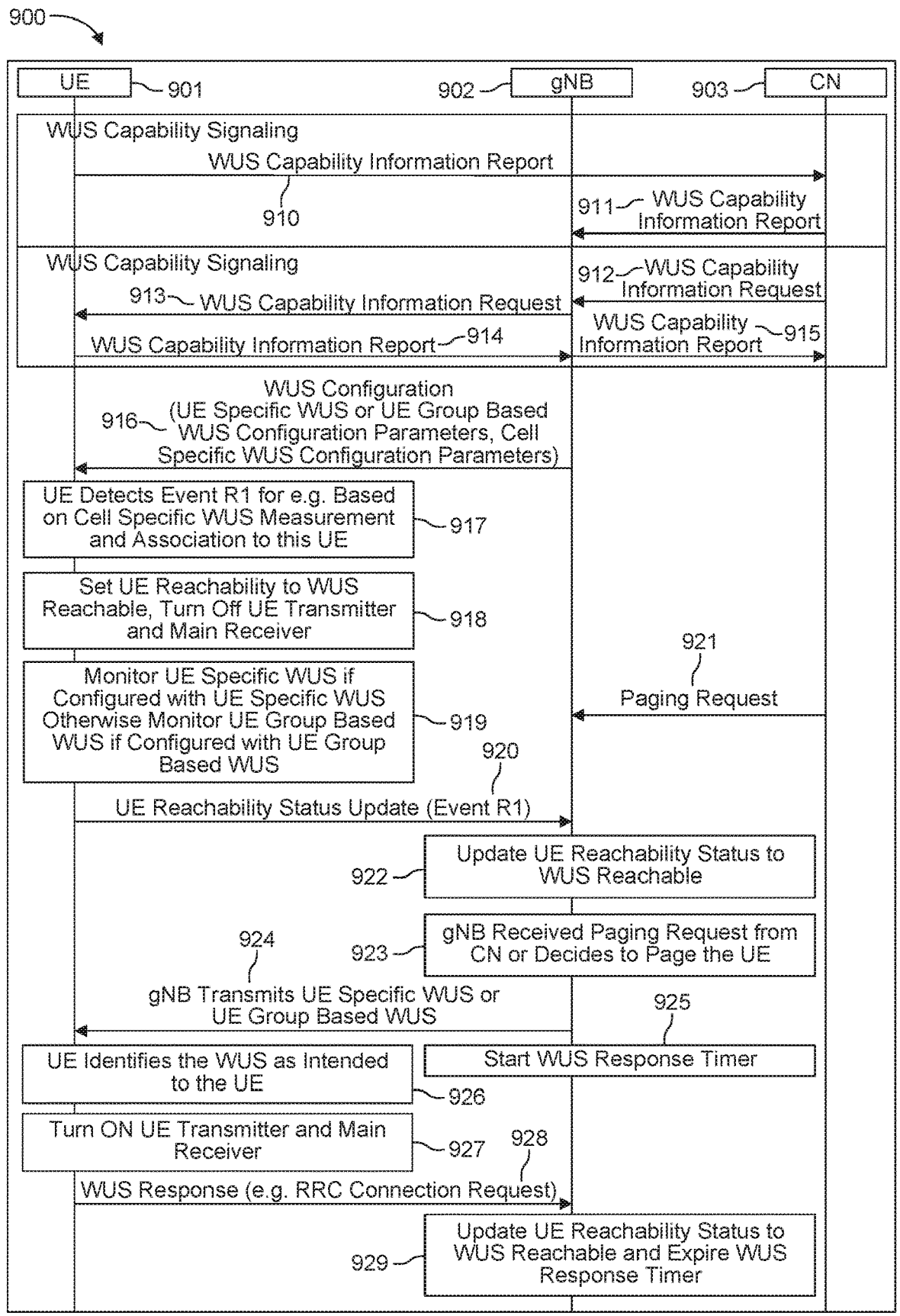
FIG. 9 is a diagram of an example procedure for configuring a WUS mode of operation in the RRC_IDLE more and RRC_INACTIVE mode.

FIG. 9 is a diagram of an example procedure 900 for configuring a WUS mode of operation in the RRC_IDLE more and RRC_INACTIVE mode in accordance with one embodiment, which may be used in combination with any of the embodiments described herein. While each step of the procedure 900 in FIG. 9 is shown and described separately, multiple steps may be executed in a different order than what is shown, in parallel with each other, or concurrently with each other. The procedure 900 is performed by a UE as an example, but the procedure 900 may also be performed by a wireless communications device, WTRU, or any other device described herein that is capable of wireless communications. The procedure 900 of FIG. 9 may be activated using RRC or other signaling (such as MAC CE) and may be performed together with DRX activation or separately. In the example of FIG. 9, the UE 901 may initiate WUS capability signaling via a WUS capability information report to the CN 903 (step 910). The CN 903 may send a WUS capability information report to the gNB 902. Alternatively, the CN 903 may may initiate WUS capability signaling via a WUS capability information request to the gNB 902 (step 912). The gNB 902 may send a WUS capability information request to UE 901 (step 913). The UE 901 may send a WUS capability information report to the gNB 902 (step 914), which may send a WUS capability information report to the CN 903 (step 915).

The gNB 902 may then send a WUS configuration (step 916). The WUS configuration may comprise UE specific WUS or UE group based WUS configuration parameters and cell specific WUS configuration parameters. The UE 901 may detect event R1 (e.g., based on cell specific WUS measurements and association with the UE 901) (step 917). The UE 901 may set UE reachability mode to WUS reachable and turn off the UE transmitter and main receiver (step 918). The UE 901 may monitor a UE specific WUS if configured with a UE specific WUS, otherwise the UE 901 may monitor a UE group based WUS if configured with a UE group based WUS (step 919). UE 901 may send a UE reachability status update (event R1) to gNB 902 (step 920).

The CN 903 may send a paging request to gNB 902 (step 921). The gNB 902 may update its UE reachability status to WUS reachable (step 922). The gNB 902 may determine whether to page the UE 901 in response to the received paging request (step 923). The gNB 902 may send a UE specific WUS or a UE group based WUS to UE 901 (step 924) and may start a WUS response timer (step 925). The UE 901 may identify the WUS as intended for it (step 926). The UE 901 may turn on its transmitter and main receiver (step 927). The UE 901 may send a WUS response (e.g., RRC connection request) to the gNB 902 (step 928). The gNB 902 may update its UE reachability status to WUS reachable and stop the WUS response timer (step 929).

Figure 10:
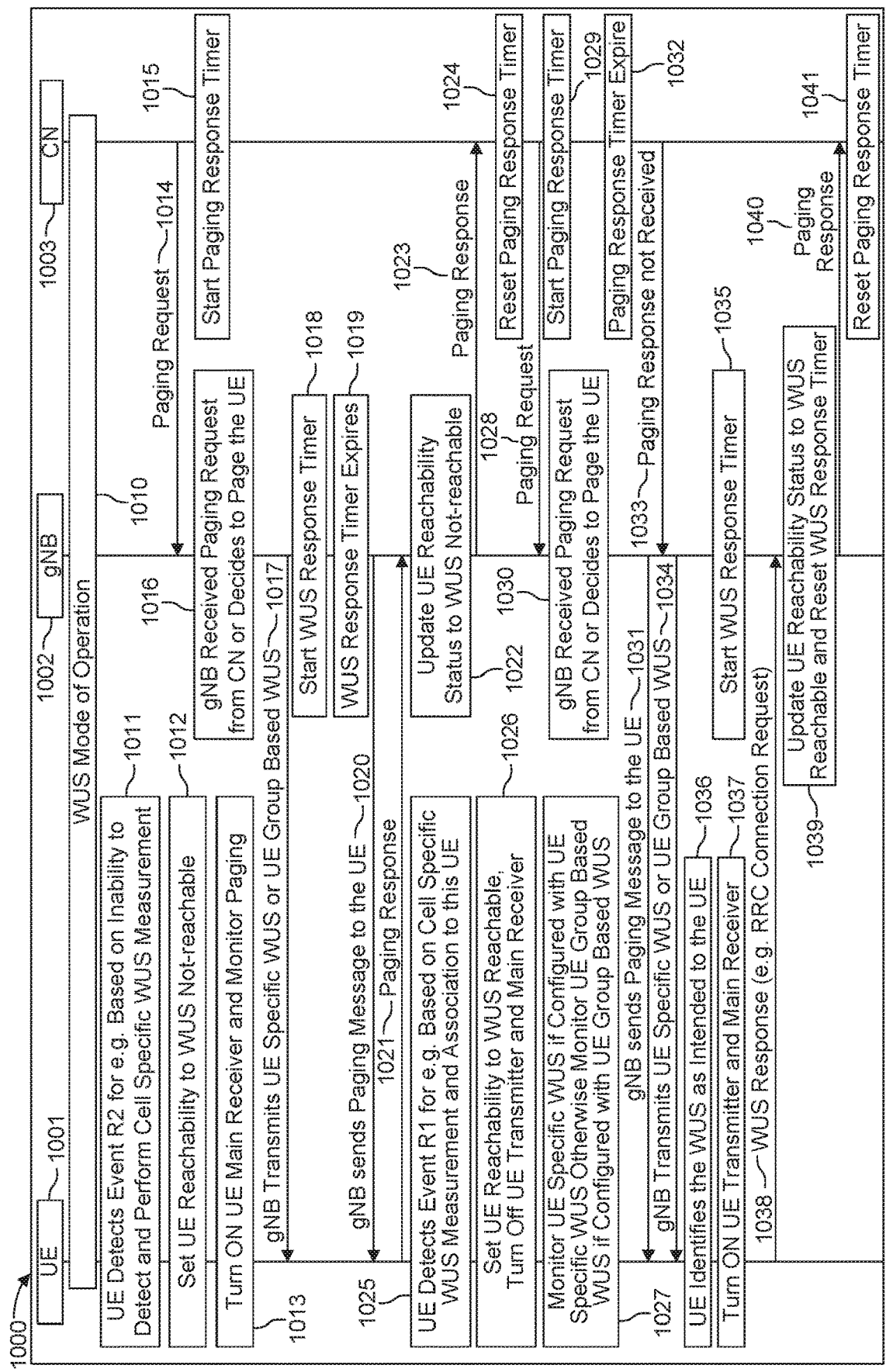
FIG. 10 is a diagram of an example procedure for when a UE transitions from WUS non-reachable to WUS reachable.

FIG. 10 is a diagram of an example procedure 1000 for transitions from WUS non-reachable to WUS reachable in accordance with one embodiment, which may be used in combination with any of the embodiments described herein. While each step of the procedure 1000 in FIG. 10 is shown and described separately, multiple steps may be executed in a different order than what is shown, in parallel with each other, or concurrently with each other. The procedure 1000 is performed by a UE as an example, but the procedure 1000 may also be performed by a wireless communications device, WTRU, or any other device described herein that is capable of wireless communications. The procedure 1000 of FIG. 10 may be activated using RRC or other signaling (such as MAC CE) and may be performed together with DRX activation or separately. Referring to FIG. 10, the UE 1001 is in the WUS mode of operation (step 1010). The UE 1001 may detect event R2, for example, based on an inability to detect and perform cell specific WUS measurements (step 1011). The UE 1001 may set the UE reachability to WUS non-reachable (step 1012). The UE 1001 may turn on the UE main receiver and monitor paging (step 1013). The CN 1003 may send a paging request to gNB 1002 (step 1014) and start a paging response timer (step 1015). The gNB 1002 may receive the paging request form the CN 1003 and decide to page the UE 1001 (step 1016). The gNB 1002 may send a UE specific WUS or UE group based WUS (step 1017). The gNB 1002 may start a WUS response timer (step 1018). The WUS response timer may expire (step 1019). The gNB 1002 may send a paging message to the UE 1001 (step 1020). The UE 1001 may send a paging response to the gNB 1002 (step 1021). The gNB 1002 may update the UE reachability status to WUS non-reachable (step 1022). The gNB 1002 may send a paging response to the CN 1003 (step 1023). The CN 1003 may reset the paging response timer (step 1024).

The UE 1001 may detect an event R1 (e.g., based on cell specific WUS measurements and association with the UE 1001) (step 1025). The UE 1001 may set UE reachability mode to WUS reachable and turn off the UE transmitter and main receiver (step 1026). The UE 1001 may monitor a UE specific WUS if configured with a UE specific WUS, otherwise the UE 1001 may monitor a UE group based WUS if configured with a UE group based WUS (step 1027).

The CN 1003 may send a paging request to gNB 1002 (step 1028) and start a paging response timer (step 1029). The gNB 1002 may receive the paging request from the CN 1003 and decide to page the UE 1001 (step 1030). The gNB 1002 may send a paging message to the UE 1001 (step 1031). The CN 1003 may send a message to gNB 1002 indicating that a paging response was not received (step 1033). The gNB 1002 may send a UE specific or UE group based WUS to UE 1001 (step 1034) and may start a WUS response timer (step 1035). The UE 1001 may identify the WUS as intended for it (step 1036). The UE 1001 may turn on its transmitter and main receiver (step 1037). The UE 1001 may send a WUS response (e.g., RRC connection request) to the gNB 1002 (step 1038). The gNB 1002 may update its UE reachability status to WUS reachable and stop the WUS response timer (step 1039). The gNB 1002 may send a paging response to the CN 1003 (step 1040). The CN 1003 may reset the paging response timer (step 1041).

UE and gNb behavior for recovering from a WUS miss-detection is described herein in accordance with another embodiment. A WUS miss-detection event for a UE is defined herein as the event in which the UE does not detect any valid WUS at the configured/calculated WUS timing or during the configured/calculated WUS timing window as defined herein.

The WUS miss-detection event for a gNB may be defined as follows: a gNB may send one or several repeated wake-up signals to a UE during the WUS timing window indicating "wake-up." Then, the gNB may transmit a NR-PDCCH to the UE that is supposed to wake up during the "DRX_On" duration. The gNB may transmit data to the UE on the NR-PDSCH but may receive no ACK/NACK from the UE.

The following are methods of UE behaviors for handling a WUS miss-detection, which may be used alternatively or in any combination:

In accordance with a first method, after miss-detection of WUS, a UE may follow the same procedure as upon detection of a valid WUS indicating "wake-up." That is, the UE may wake up its main receiver and ramp-up before the DRX on duration, may synchronize with the gNB in the DL, and may detect for NR-PDCCHs in the DRX on duration.

In accordance with a second method, after miss-detection of WUS, a UE may follow the same procedure as upon detection of a valid WUS indicating "no wake-up." That is, the UE may sleep through the upcoming DRX cycle and may not wake up until the next WUS timing window. Whether the UE wakes up or not may be configured in the WUS and/or DRX configurations.

In accordance with a third method, after miss-detection of WUS, a UE may wake up or not according to predetermined or configured criteria or parameters. For example, a criterion for the UE behavior of waking up or not may be determined by the WUS statistics in the last N DRX cycles. If the UE has received a WUS indicating "wake-up" in K out of N DRX cycles, it may wake up. Otherwise, the UE may not wake up. The parameters K and N may depend on the UE's traffic model of current applications. UE wake up criteria and parameters (such as K and N) may be configured in its WUS and/or DRX configuration. Alternatively, the decision of the UE to wake up or not may be based on the device/service type. For example, if a best effort service is being used, the UE may not wake up; but if an application with requirement of high reliability is being supported, the UE may choose to wake up.

In accordance with a fourth method, after M miss-detections of the WUS, a UE may "force" its main receiver to wake up to re-acquire synchronization in the DL (for example, acquire SS and PBCH, CSI-RS).

In accordance with a fifth method, a UE may initiate the process to re-configure WUS parameters (window length, channel coding, and channel resources) and may de-activate the WUS with the network based on WUS miss-detection statistics.

The following are methods for gNB behavior for WUS miss-detection recovery, which may be used alternatively or in any combination.

In accordance with a first method, the gNB may re-transmit the WUS at the next WUS timing window (of the next DRX cycle) and perform more robust transmissions of subsequent NR-PDCCHs of the UE (e.g. higher aggregation level, etc).

In accordance with a second method, a gNB may initiate the process to re-configure WUS parameters (window length, channel coding, and channel resources) and de-activate the WUS with the UE based on WUS miss-detection statistics.

Alternatively, an uplink WUS-response channel/signal may be defined to allow the UE to ACK its reception of the WUS. To minimize power consumption, the WUS response channel/signal may be transmitted using a low power transmitter that operates in a band with the same/similar characteristics as the band used to transmit the WUS. Turning on the 5G transmitter to send the WUS response may be avoided. For example, such a channel/signal may be a PRACH or common UL channels (energy detection based). This may enable the gNB to determine the cause of a miss-detection.

UE and gNb behavior for recovering from a WUS false-alarm-detection event is described herein in accordance with another embodiment. A WUS false-alarm-detection event is defined for a UE as an event in which the UE detects a WUS indicating "wake-up." Then after the UE wakes up, the UE listens for the PDCCH in the DRX cycle but does not receive any valid PDCCH or PDSCH in the DRX cycle.

An uplink WUS-response channel/signal may be used to allow the UE to ACK its reception of WUS. To minimize power consumption, the WUS response channel/signal may be transmitted using a low power transmitter that operates in a band with same/similar characteristics as the band used to transmit the WUS. Turning on the 5G transmitter to send the WUS-response may be avoided. For example, such a channel/signal may be a PRACH or common UL channels (energy detection based). This may enable the gNB to detect the UE's false-alarm detection immediately upon receiving un-expected WUS response. This may also help the UE determine a cause of the false-detection cause.

Either the UE or gNB may initiate a process to re-configure WUS parameters (window length, WUS channel resources locations, channel coding, and channel resources) and de-activate the WUS with the network based on WUS false-alarm detection statistics. For example, if the gNB determines that the false alarm is caused by interference, it may configure a different frequency domain resource(s) used for the wake-up signals.

Group-based WUS procedures are described herein in accordance with another embodiment. For deployment scenarios where there are a large number of UEs in a cell, group based WUS may be configured resulting in increased efficiency (similar to a paging group). Instead of waking up one UE, the group-based WUS may wake up a group of UEs.

A group of UEs may be configured by higher layer signaling (such as via RRC), each group has its own group ID or group RNTI. The UEs in the group may be arranged in a predetermined order. Each UE's index within the group may also be included in the WUS group configuration signaling. A UE may be configured for multiple WUS groups. Upon receiving a WUS addressed to its group ID, the UE may wake up its main receiver to detect NR-PDCCH in the DRX on duration.

Not all UEs within a group may have the same data traffic (going in and out of DRX cycle). This may impact the power savings benefits experienced by UEs within the group. Therefore, information may be included indicating whether each particular UE within a WUS group needs to wake up or not (or may receive NR-PDCCHs/grants in the upcoming DRX ON duration). Examples of such signaling include but are not limited to:

A bitmap indication of UEs that may need to wake up within a group. For a group with M UEs, the bitmap subfield may have the length of M bits, wherein each bit corresponds to a UE in the order of their positions. A position in the bitmap set to "1" may be used to indicate "wake-up" and may be set to "0" to indicate "no wake-up".

If analog FSK type signaling is used for WUS, then on/off frequencies may be used to indicate the RNTI/group of UEs.

Figure 11A:
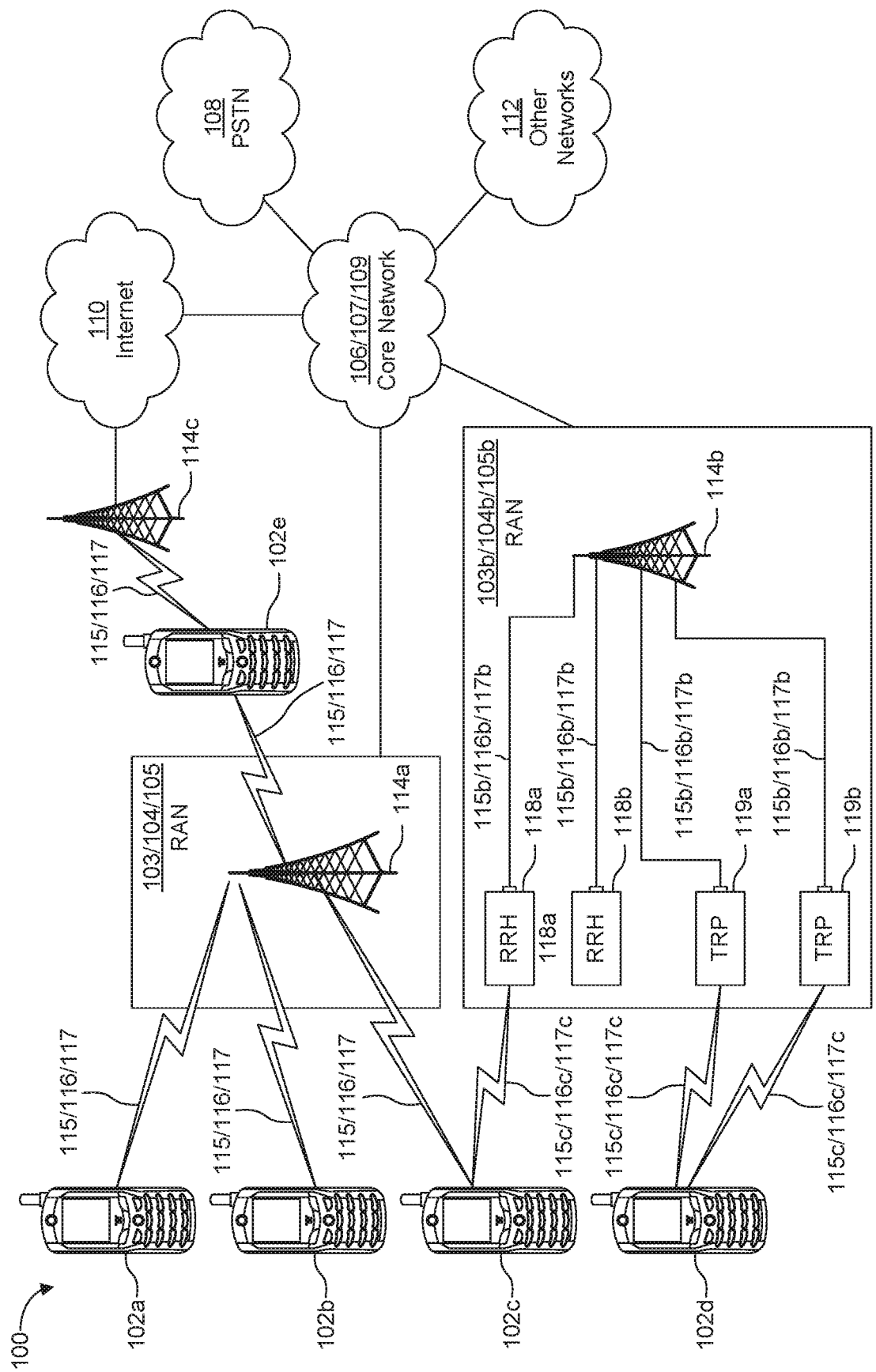
FIG. 11A illustrates an exemplary communications system in which the technical solutions disclosed herein may be embodied.

FIG. 11A illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 11A-11E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a wireless communications device, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 11A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet an embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 11A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 11A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 11A may be configured to communicate with the base station 114a, which may employ a cellular-based radio technology, and with the base station 114c, which may employ an IEEE 802 radio technology.

Figure 11B:
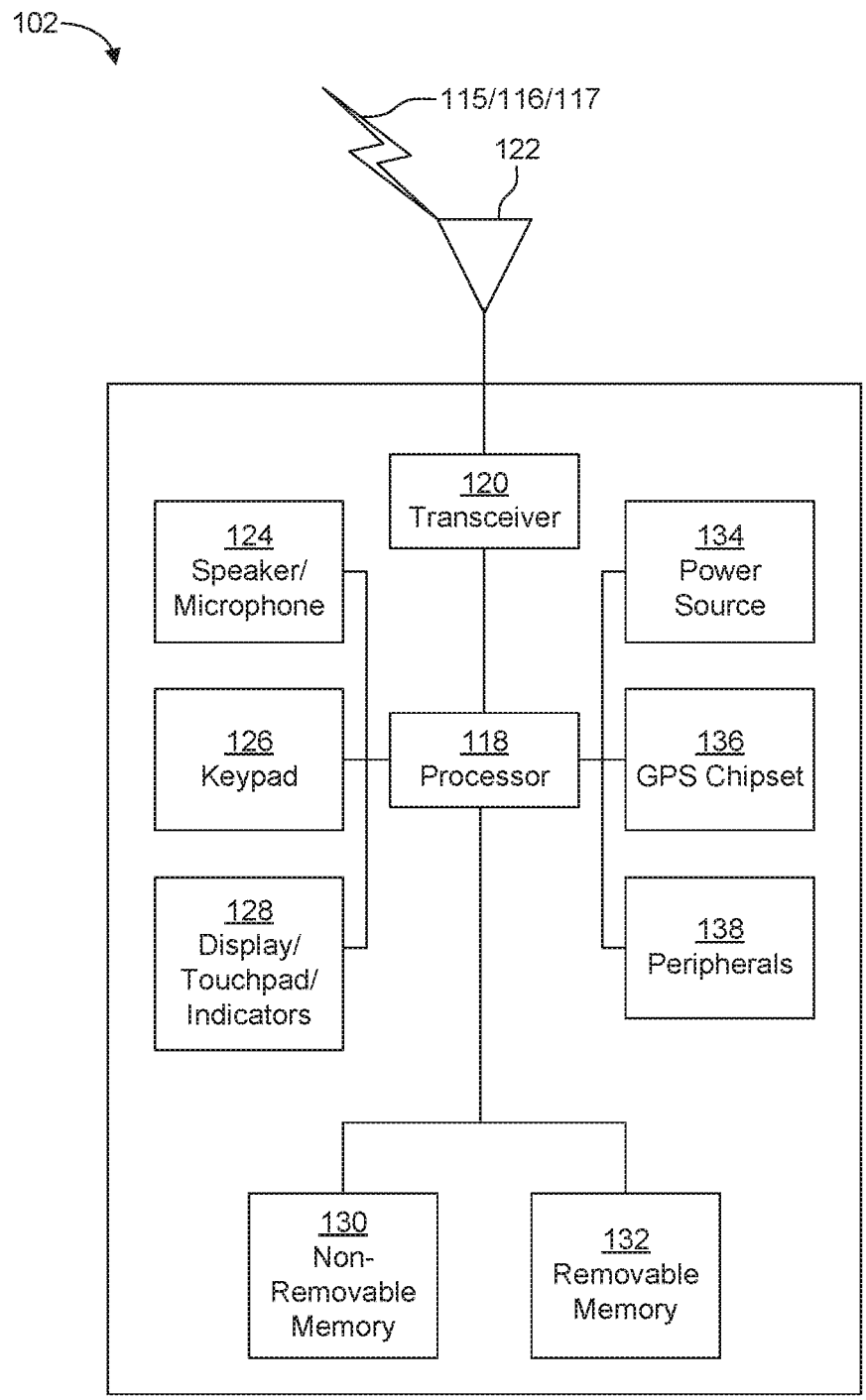
FIG. 11B illustrates an exemplary apparatus configured for wireless communication according to an embodiment.

FIG. 11B is a block diagram of an example apparatus or device configured for wireless communications in accordance with the embodiments illustrated herein, such as for example, a WTRU 102. As shown in FIG. 11B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 11B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 11B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive Although not shown in FIG. 11A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 11A may be configured to communicate with the base station 114a, which may employ a cellular-based radio technology, and with the base station 114b, which may employ an IEEE 802 radio technology.

FIG. 11B is a block diagram of an example apparatus or device configured for wireless communications in accordance with the embodiments illustrated herein, such as for example, a WTRU 102. As shown in FIG. 11B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 11B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 11B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 11B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 11C:
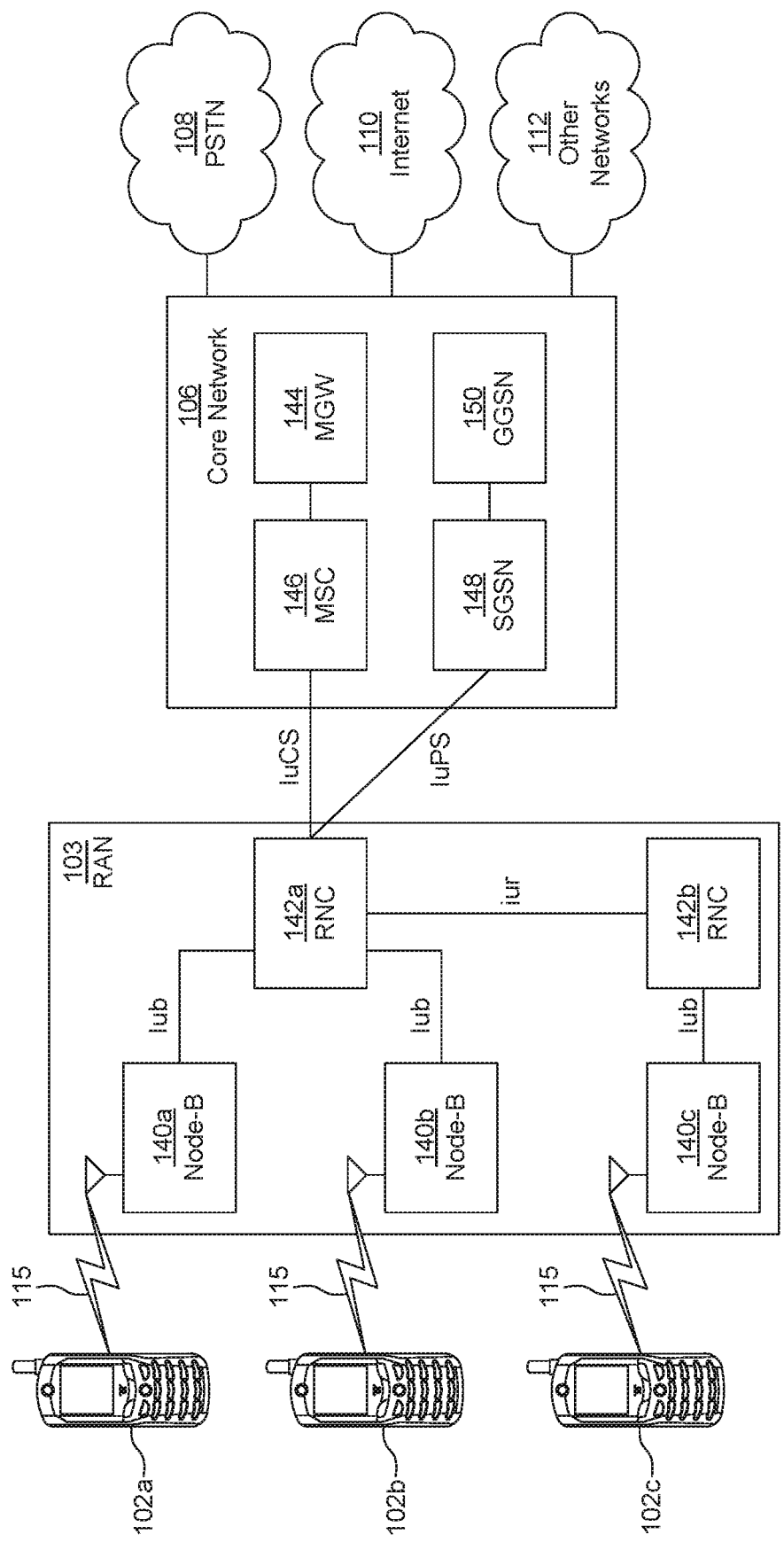
FIG. 11C is a system diagram of an example of a radio access network and a core network in which the technical solutions disclosed herein may be embodied.

FIG. 11C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 11C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 11C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 11C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 11D:
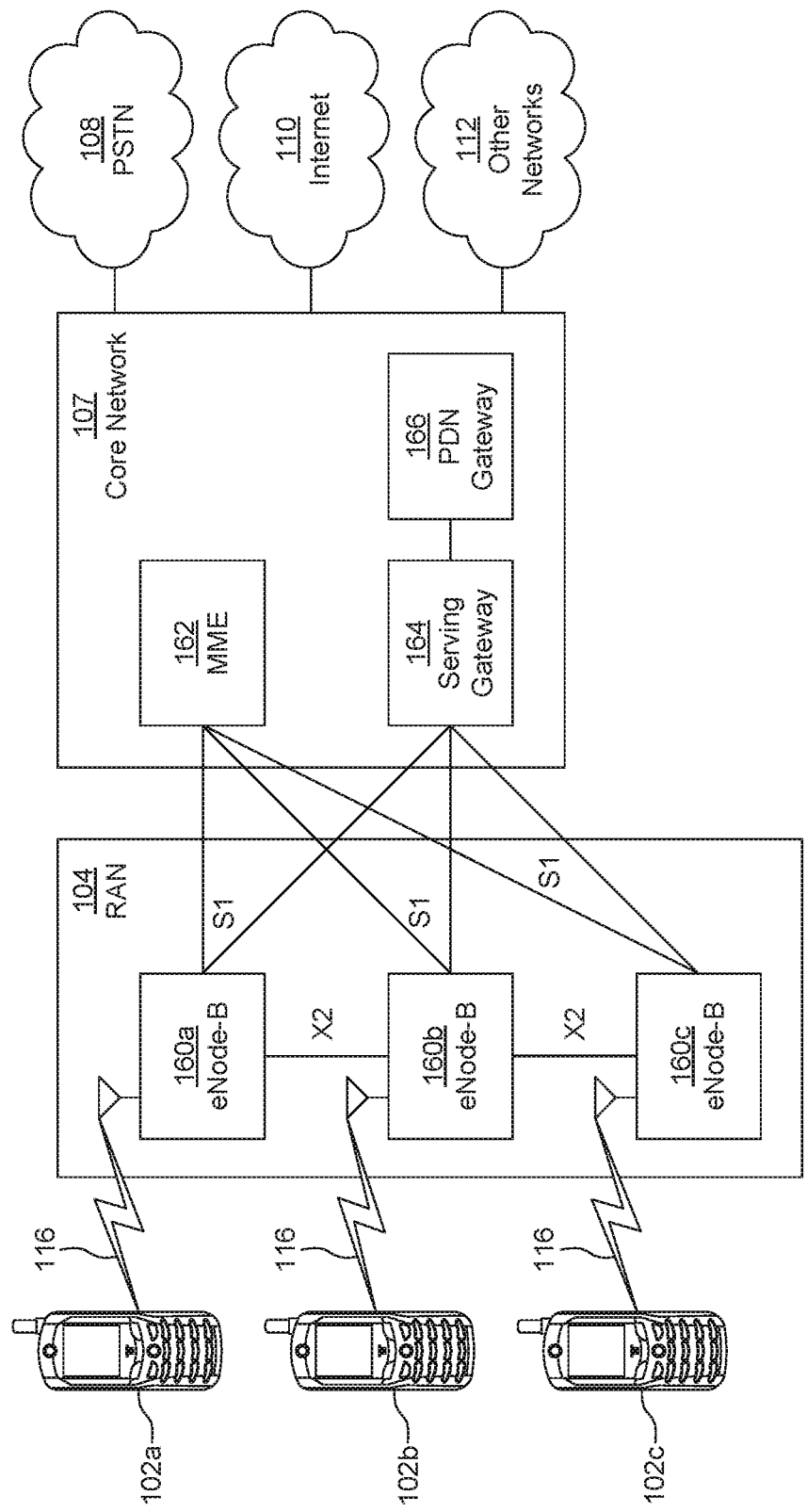
FIG. 11D is a system diagram of another example of a radio access network and a core network in which the technical solutions disclosed herein may be embodied.

FIG. 11D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 11D, the eNode-Bs 160a, 160b, 160c may communicate with one another over an X2 interface.

The core network 107 shown in FIG. 11D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 11E:
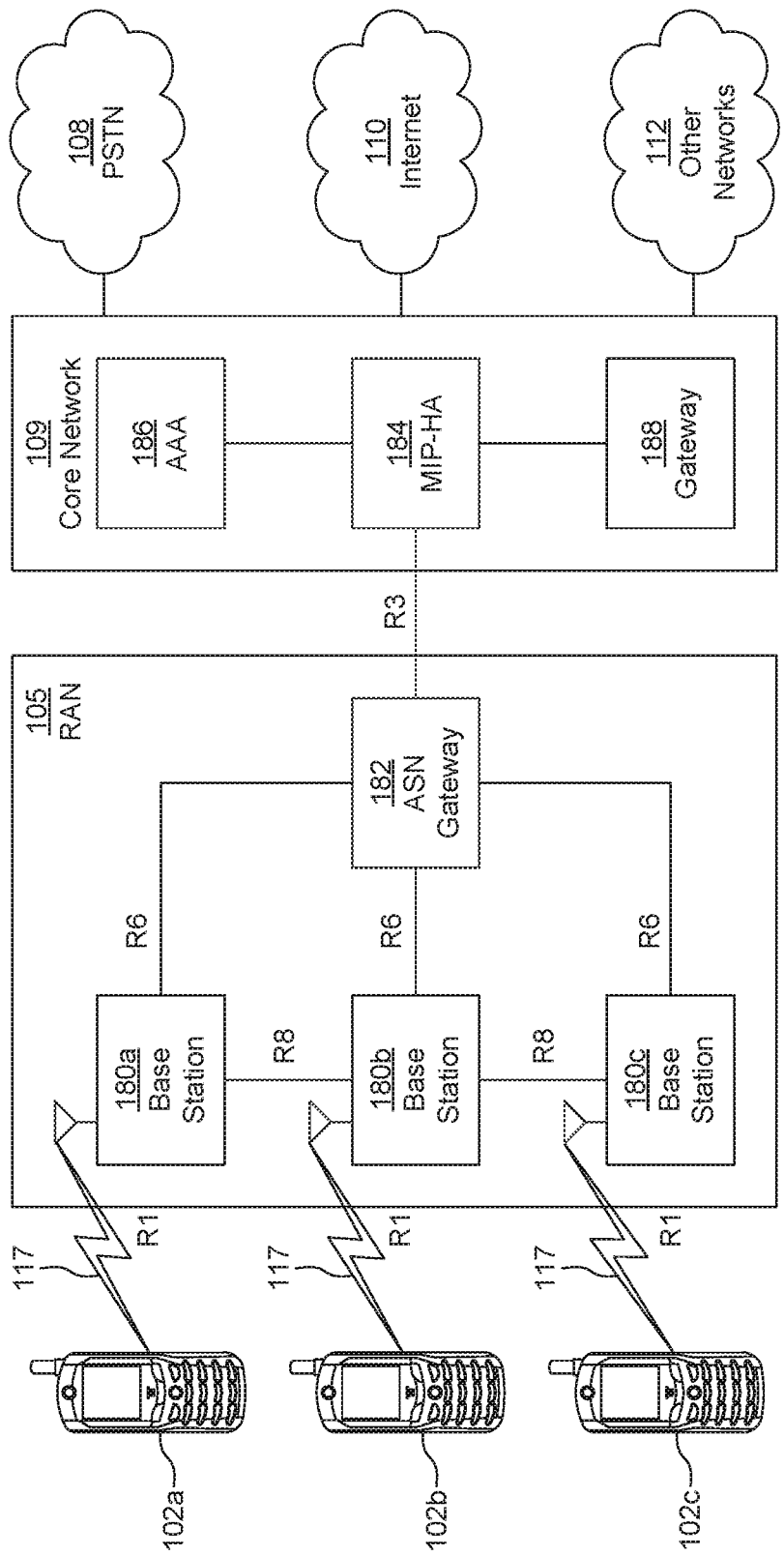
FIG. 11E is a system diagram of yet another example of a radio access network and a core network in which the technical solutions disclosed herein may be embodied.

FIG. 11E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 11E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 11E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 11E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 11A, 11C, 11D, and 11E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 11A, 11B, 11C, 11D, and 11E are provided by way of example only, and it is understood that the subject matter disclosed and claimed herein may be embodied or implemented in any similar communication system, whether presently defined or defined in the future.

Figure 11F:
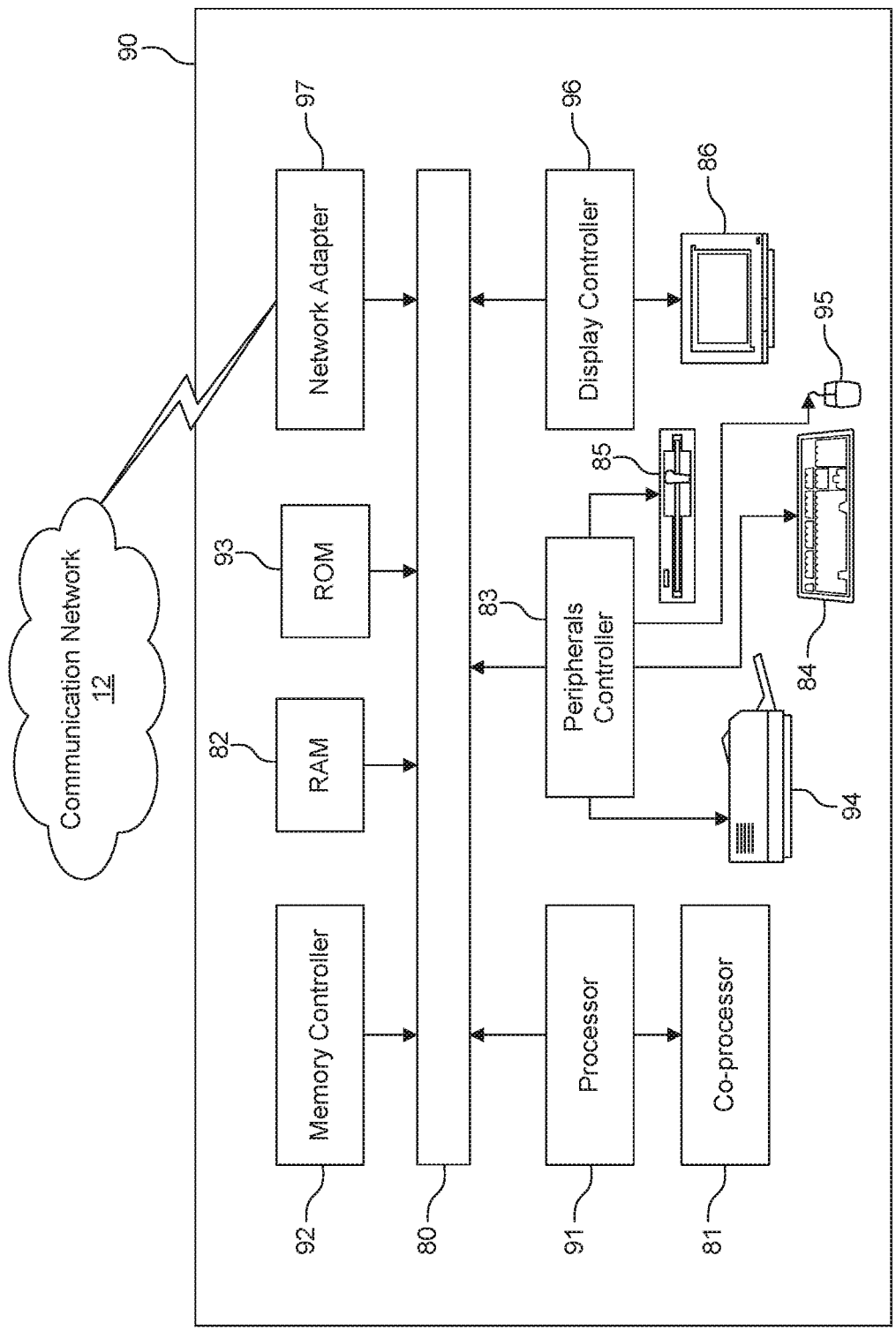
FIG. 11F is a block diagram of an exemplary computing system which may be used to implement one or more nodes or entities of the networks shown in FIGS. 11A, 11C, 11D and 11E.

FIG. 11F is a block diagram of an exemplary computing system 90 in which one or more apparatuses of the communications networks illustrated in FIGS. 11A, 11C, 11D and 11E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 11A, 11B, 11C, 11D, and 11E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

The description of the solutions above is provided to enable the making or use of those solutions. Various modifications to these solutions will be readily apparent, and the generic principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A wireless communication device, comprising:
circuitry configured to
control power saving function of the wireless communication device based on a discontinuous reception (DRX) cycle, the DRX cycle comprising an ON duration and an OFF duration;
receive, from a network node, information indicating parameters including a group identifier, a wake-up signal timing offset, and a triggering criteria associated with a forced wake-up, the group identifier comprising a wake-up signal radio network temporary identifier (WUS-RNTI), the wake-up signal timing offset indicating a time offset for communicating a wake-up signal before the ON duration of the DRX cycle; and
monitor a wake-up signal transmission channel according to the wake-up signal timing offset and the group identifier for receiving a wake-up signal, from the network node,
wherein the group identifier addresses a plurality of wireless communication devices, and the wake-up signal comprises an index field that identifies a wake-up condition for each of the plurality of wireless communication devices in an ordered group, the index field comprising a bitmap with a bit indicating the wake-up condition for each of the plurality of wireless communication devices in the ordered group,
wherein the wake-up signal transmission channel is scrambled with the WUS-RNTI,
wherein the circuitry is configured to wake up as the forced wake-up under a condition that the triggering criteria is met even without detecting an indication to wake up by the wake-up signal.

2. The wireless communication device of claim 1, wherein the circuitry is configured to
detect the wake-up signal on the wake-up signal transmission channel;
determine whether the wake-up signal indicates the wake-up condition or a non-wake-up condition; and
based on detecting the wake-up condition indicated by the wake-up signal, monitor a physical downlink control channel (PDCCH) at a next ON duration of the DRX cycle.

3. The wireless device of claim 1, wherein the circuitry is further configured to,
detect the wake-up signal on the wake-up signal transmission channel; and
determine whether the wake-up signal indicates the wake-up condition or a non-wake-up condition; and
based on detecting the non-wake up condition indicated by the wake-up signal, skip monitoring a physical downlink control channel (PDCCH) at a next ON duration of the DRX cycle.

4. The wireless device of claim 1, wherein the circuitry is further configured to,
based on detecting no wake-up signal on the wake-up signal transmission channel, check for the triggering criteria associated with the forced wake-up.

5. The wireless communication device of claim 4, wherein the circuitry is further configured to,
based on detecting that the triggering criteria associated with the forced wake-up indicates the wake-up condition, monitor Physical Downlink Control Channel (PDCCH) at a next ON duration of the DRX cycle.

6. The wireless communication device of claim 4, wherein the circuitry is further configured to,
- based on detecting that the criteria associated with the forced wake-up indicates a non-wake up condition, skip monitoring Physical Downlink Control Channel (PDCCH) at a next ON duration of the DRX cycle.

7. The wireless communication device of claim 1, wherein
- the group identifier is indicated by frequency-shift keying (FSK) on and off frequencies.

8. The wireless communication device of claim 1, wherein the circuitry is further configured to
- transmit a wake-up signal capability in a UE capability message to the network node using RRC message.

9. The wireless communication device of claim 1, wherein the wake-up signal transmission channel is monitored in radio resource control (RRC) connected mode.

10. The wireless communication device of claim 1, wherein the parameters further comprise criteria associated with the forced wake-up condition comprising a maximum time drift.

11. The wireless communication device of claim 10, wherein the circuitry is further configured to,
- if the received wake-up signal indicates the wake-up condition, synchronize timing of the wireless communication device with the network node if an estimated time drift is higher than the maximum time drift.

12. The wireless communication device of claim 10, wherein the criteria associated with the forced wake-up comprises a time since a last indicated wakeup condition.

13. The wireless communication device of claim 1, wherein the information is received via RRC message.

14. The wireless communication device of claim 1, wherein the information further comprises a wake-up signal duration.

15. A network node, comprising:
- circuitry configured to
  - transmit, to a wireless communication device, information indicating parameters including a group identifier, a wake-up signal timing offset, and a triggering criteria associated with a forced wake-up, the group identifier comprising a wake-up signal radio network temporary identifier (WUS-RNTI), the wake-up signal timing offset indicating a time offset for communicating a wake-up signal before an ON duration of a discontinuous reception (DRX) cycle, the DRX cycle comprising the ON duration and an OFF duration for controlling power saving function; and
  - transmit a wake-up signal, to the wireless communication device, according to the wakeup signal timing offset and the group identifier, wherein the group identifier addresses a plurality of wireless communication devices, and the wake-up signal comprises an index field that identifies a wake-up condition for each of the plurality of wireless communication devices in an ordered group, the index field comprising a bitmap with a bit indicating the wake-up condition for each of the plurality of wireless communication devices in the ordered group,
- wherein the wireless communication device is configured to wake up as the forced wake-up under a condition that the triggering criteria is met even without detecting an indication to wake up by the wake-up signal.

* * * * *